United States Patent
Yamaguchi et al.

(10) Patent No.: US 6,628,343 B1
(45) Date of Patent: Sep. 30, 2003

(54) TELEVISION SIGNAL RECEPTION CIRCUIT, AUTOMATIC PHASE SHIFT CONTROL CIRCUIT AND EQUAL AMPLITUDE ADDITION CIRCUIT

(75) Inventors: Toshihiro Yamaguchi, Kanagawa (JP); Shinichi Kitazono, Kanagawa (JP); Koichi Ohya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/083,544

(22) Filed: May 22, 1998

(30) Foreign Application Priority Data

May 23, 1997 (JP) .......................................... P9-134044
May 23, 1997 (JP) .......................................... P9-134045
May 23, 1997 (JP) .......................................... P9-134046

(51) Int. Cl.[7] .............................................. H04N 5/455
(52) U.S. Cl. ........................ 348/731; 348/726; 455/304
(58) Field of Search ................................ 348/731, 725, 348/726, 727, 732, 733; 455/150.1, 313, 179.1, 318, 180.1, 304, 180.3, 305, 189.1, 306, 190.1, 302, 303; H04N 5/445

(56) References Cited

U.S. PATENT DOCUMENTS 5,398,080 A * 3/1995 Sakashita et al.
5,901,349 A * 5/1999 Guegnaud et al.

FOREIGN PATENT DOCUMENTS

JP 3-60206 * 3/1991

OTHER PUBLICATIONS

Hickok, William, "Amplitude and phase sensitive comb filter", Reasearch Disclosure #17356, Sep. 1978, pp. 56–57.*
IEE Transactions on Consumer Electronics, "Advanced Low Voltage Single Chip Radio IC".

* cited by examiner

Primary Examiner—David E. Harvey
(74) Attorney, Agent, or Firm—Rader, Fishman & Grauer PLLC; Ronald P. Kananen

(57) ABSTRACT

The invention provides a television reception circuit wherein a front end circuit of a television receiver is integrated and outputting of an image frequency is suppressed. The television signal reception circuit comprises an integrated circuit which in turn includes an automatic gain circuit for controlling a level of an input signal, first and second frequency mixture circuits to which an output of the automatic gain circuit is inputted, a $\pi/2$ phase shifting circuit for supplying local oscillation frequencies having a phase difference of $\pi/2$ from each other to the first and second frequency mixture circuits, first and second $\pi/4$ phase shifting circuits for shifting phases of outputs of the first and second frequency mixture circuits by $+\pi/4$ and $-\pi/4$, respectively, and an addition circuit for adding outputs of the first and second $\pi/4$ phase shifting circuits. The television signal reception circuit outputting a television signal inputted to the integrated circuit through a variable frequency tuning circuit as an intermediate frequency signal. Also an automatic phase shift control circuit and an equal amplitude addition circuit suitable for use with a television signal reception circuit are disclosed.

12 Claims, 17 Drawing Sheets

π/2 PHASE CONTROL CIRCUIT

TELEVISION SIGNAL RECEPTION CIRCUIT, AUTOMATIC PHASE SHIFT CONTROL CIRCUIT AND EQUAL AMPLITUDE ADDITION CIRCUIT

BACKGROUND OF THE INVENTION

This invention relates generally to a circuit which involves phase shifting and specifically to a television reception circuit suitable to receive a broadcasting channel selected from among a plurality of channels and output a signal of the received broadcasting channel as an intermediate frequency signal, and more particularly to an integrated television reception circuit which can efficiently remove an image frequency. The preasent invention relates also to a phase shifting circuit for shifting the phase of a signal inputted thereto, and more particularly to an automatic phase shift control circuit which can set a phase shift amount accurately within a broad frequency range. The present invention further relates to an equal amplitude addition circuit which adds signals inputted thereto with amplitudes equal to each other, and more particularly to an equal amplitude addition circuit suitable to add two balanced input signals with amplitudes equal to each other.

A reception circuit for selecting and receiving a desired channel from among a large number of television broadcasting channels includes a radio frequency amplifier for amplifying the selected broadcasting signal and a frequency mixing circuit for converting the radio frequency output of the radio frequency amplifier into an intermediate frequency, and has such a circuit construction as shown, for example, in FIG. 17.

Referring to FIG. 17, the reception circuit shown includes a filter 1 of the single-tuned type for selecting a desired frequency from among channel frequencies of broadcasting radio waves received by an antenna, and an amplifier 2 of the automatic gain control type for controlling the level of the received signal selected by the filter 1. The amplifier 2 is controlled based on a demodulation output (AGC) not shown so that the output level thereof may remain within a predetermined level range.

The reception circuit further includes a double-tuned filter 3 for limiting the pass band of the television signal. The double-tuned filter 3 cooperates with the single-tuned filter to vary the pass frequency of the broadcasting radio wave of the selected channel in accordance with a channel selection signal not shown.

The reception circuit further includes a trap circuit 4 for removing from within the received broadcasting frequency an image frequency which is mixed into the received broadcasting frequency when the broadcasting frequency is converted into an intermediate frequency. As hereinafter described, the frequency to be removed is set by the trap circuit 4 so that an image intermediate frequency which serves as a disturbing wave may not be produced. The reception circuit further includes a frequency conversion circuit (mixing circuit) 5 for converting the inputted radio frequency signal into an intermediate frequency (58.75 MHz) signal. The frequency conversion circuit 5 is formed from an integrated circuit which includes a local signal oscillator Lo, a frequency mixer MIX, and an intermediate frequency amplifier IFA for selecting an intermediate frequency.

In the television reception circuit described above, a local oscillation frequency (which may be hereinafter referred to as local frequency) fLo is set corresponding to a frequency (which may be hereinafter referred as selected frequency) fD of a desired selected channel as seen from FIG. 18, and the local frequency fLo and the selected frequency fD are mixed by the frequency mixer MIX so that a frequency of a difference between them is outputted as an intermediate frequency fIF from the frequency mixer MIX.

By the way, if an image frequency fIM is mixed at a point spaced by the intermediate frequency fIF from the local frequency fLo in the frequency mixer MIX, then the frequency mixer MIX outputs an undesired intermediate frequency fIF(IM) which includes the same frequency component also with regard to the image frequency fIM. Therefore, in order to prevent the image frequency component fIM, which makes an image diturbance, from being mixed in the frequency mixer MIX, the television reception circuit of FIG. 17 includes the trap circuit 4 for removing the image frequency.

Consequently, the television reception circuit described above is disadvantageous in that the channel selection control circuit thereof is complicated because the three circuits of the single-tuned circuit, double-tuned circuit and image trap circuit must be adjusted each time the selected channel is changed and also in that it is difficult to adjust the channel selection control circuit so that an image disturbance may be reduced in an entire reception band.

Thus, another reception circuit has been proposed wherein a mixing circuit formed as an integrated circuit includes two frequency mixers to cancel an image frequency.

FIG. 19 shows a construction in principle of the mixing circuit just mentioned. Referring to FIG. 19, a frequency fD of a desired selected channel is supplied to a first frequency mixer MIX(Q) and a second frequency mixer MIX(I). Meanwhile, local frequencies fLo(Q) and fLo(I) produced by a π/2 phase shifter PH and having a phase difference of 90 degrees from each other are supplied to the frequency mixers MIX(Q) and MIX(I), respectively, and intermediate frequencies corresponding to frequency differences between the selected channel frequency and the local frequencies are outputted from the first and second frequency mixers MIX (Q) and MIX(I), respectively. The intermediate frequencies are outputted through a phase shifter PSN by which they are shifted by π/2 relative to each other, and then combined by an adder ADD, thereby cancelling an inputted intermediate frequency fIM (refer to *IEEE Transactions on Consumer Electronics*, Vol. 38, No. 3, August, 1992).

However, while the image cancelling mixing circuit described above has been put into practical use in reception circuits for radio frequencies included in an ordinary comparatively low frequency band, it is difficult to use it for a television reception circuit.

The reason is that, with regard to a broadcasting signal having a frequency band of several MHz as in the case of television broadcasting waves, it is difficult to form the π/2 phase shifter PH of the image cancelling mixing circuit so that it may shift the phases of local oscillation frequencies accurately by π/2 whichever broadcasting channel is received because of an influence of a dispersion of resistance, a dispersion of capacitance and parasitic floating capacitance when an integrated circuit is formed. Further, a high cost is required because a large number of elements are involved. From those reasons, it is considered difficult to put the image cancelling mixing circuit described above into practical use.

A phase shifting circuit which is employed in such an image cancelling mixing circuit as described above and causes the phase of an ac signal to lead or lag has been realized using various circuits. Where a phase shifting circuit is formed, for example, from an analog circuit in which a circuit device formed from resistors and capacitors is used, it is difficult to form the phase shifting circuit so that it may exhibit a fixed phase shift amount over a broad frequency range.

This arises from the fact that, with a circuit wherein capacitors having impedance and resistors are integrated, it is difficult to set a phase shift amount having a high degree of accuracy because of an absolute dispersion in the impedance or resistance and the fact that the phase shift amount is varied by an influence of a floating capacitance and so forth of the circuit by the frequency of an ac signal inputted to the phase shifting circuit. It is difficult to form a phase shifting circuit of the type described so that it shifts the phase of an input signal by a fixed angle over a broad frequency range.

Particularly where a phase shifting circuit is formed as an integrated circuit, dispersions in resistance of the circuit and floating capacitance derived in the circuit make it difficult to provide a desired phase shift amount to an inputted signal. Further, in such a circuit that an input signal exhibits a variation in frequency, it is difficult to always provide an accurate phase shift amount even if resistors, capacitors and so forth which form a phase shifting circuit are connected externally.

In the meantime, an ordinary signal addition circuit is constructed such that signals of given levels are inputted as they are to an adder.

An addition circuit of such an ordinary type as just mentioned outputs, if it adds a signal whose level is "a" and another signal whose level is "b", a signal whose level is "a+b".

Meanwhile, a circuit of the type which performs addition to remove an unnecessary signal component such as, for example, the image frequency component fIM in the television reception circuit described hereinabove with reference to FIG. 17 is required to add two inputted signals with equal levels to each other. However, an ordinary addition circuit provides an addition output of a varying level where the levels of inputted signals to be added do not have a fixed value.

Particularly where signals having a phase difference are combined with each other, it is sometimes demanded to add two signals having different amplitudes so that the levels thereof may be equal to each other. However, the demand cannot be satisfied by an ordinary addition circuit. Particularly where an addition circuit for adding signals in a radio frequency region is formed as an integrated circuit, it is difficult to form an addition circuit having a high degree of accuracy because of an influence of dispersions of resistance values and/or floating capacitances.

SUMMARY OF THE INVENTION

It is an object of the present invention to provide a television reception circuit wherein a front end circuit of a television receiver is integrated and outputting of an image frequency is suppressed.

It is another object of the present invention to provide a phase shift control circuit wherein a phase shift amount of an inputted ac signal can be set accurately.

It is a further object of the present invention to provide an equal amplitude addition circuit wherein signals of arbitrary levels inputted can be added with levels equal to each other.

In order to attain the objects described above, according to an aspect of the present invention, there is provided a television signal reception circuit, comprising an integrated circuit including an automatic gain circuit for controlling a level of an input signal, first and second frequency mixture circuits to which an output of the automatic gain circuit is inputted, a $\pi/2$ phase shifting circuit for supplying local oscillation frequencies having a phase difference of $\pi/2$ from each other to the first and second frequency mixture circuits, a first $\pi/4$ phase shifting circuit for shifting a phase of an output of the first frequency mixture circuit by $+\pi/4$, a second $\pi/4$ phase shifting circuit for shifting a phase of an output of the second frequency mixture circuit by $-\pi/4$, and an addition circuit for adding outputs of the first and second $\pi/4$ phase shifting circuits, the television signal reception circuit outputting a television signal inputted to the integrated circuit through a variable frequency tuning circuit as an intermediate frequency signal.

With the television signal reception circuit, since a signal processing circuit formed as the integrated circuit for converting a received television signal into an intermediate frequency signal is provided on a semiconductor integrated circuit board, absolute dispersions of the elements which compose the circuit are eliminated, and besides, since the reception circuit adopts a circuit of the image cancellation type formed from the components described above, miniaturization of the reception circuit can be achieved and a disturbing image frequency can be removed with a high degree of accuracy. Consequently, a trap circuit which is normally required for a channel selection circuit can be eliminated.

Preferably, the $\pi/2$ phase shifting circuit includes a phase comparator for comparing phases of phase-shifted outputs of the $\pi/2$ phase shifting circuit and signals prior to the phase shifting by the $\pi/2$ phase shifting circuit with each other, and a $\pi/2$ phase control circuit to which an output of the phase comparator is fed back. Here, the $\pi/2$ phase shifting circuit serves as an automatic phase shifting circuit which can effect accurate phase shifting over all frequencies. This reduces an influence of a dispersion of each element of the semiconductor integrated circuit. Consequently, adjustment operations required for the reception circuit are reduced remarkably, resulting in achievement in reduction of the cost and also in facilitation in designing.

Preferably, the addition circuit includes a level detector for detecting a level difference between first and second signals inputted thereto, and an adder for adding the first and second signals with levels equal to each other based on a detection output of the level detector. Here, the addition circuit serves as an automatic addition circuit which can effect complete removal of an image frequency. This reduces an influence of a dispersion of each element of the semiconductor integrated circuit. Consequently, adjustment operations required for the reception circuit are reduced remarkably, resulting in achievement in reduction of the cost and also in facilitation in designing.

According to another aspect of the present invention, there is provided an automatic phase shift control circuit, comprising a phase control circuit for variably controlling a phase shift amount in accordance with a control signal, a phase comparison circuit for comparing a phase difference between two output signals outputted from the phase control circuit and having predetermined phase amounts, a low frequency extraction circuit for extracting a dc component from a phase difference signal outputted from the phase comparison circuit, and a feedback circuit for feeding back an output of the low frequency extraction circuit as the control signal to the phase shift control circuit.

With the automatic phase shift control circuit, the phase shift amount of the phase control circuit can be corrected automatically so that it may be equal to a set phase shift amount. Consequently, even when the frequency of an input signal whose phase is to be shifted exhibits a great variation, the automatic phase shift control circuit can produce a phase shifted signal having a phase shifted accurately by a predetermined amount.

Further, also where the automatic phase shift control circuit is formed on a semiconductor integrated circuit board, absolute dispersions of the elements which form the circuit can be absorbed by the circuitry which feeds back the result of the phase comparison. Consequently, the automatic phase shift control circuit can be produced with a reduced cost using a comparatively small number of elements and adjustment operations therefor can be reduced remarkably, resulting in achievement in reduction of the cost.

Preferably, the phase shift control circuit is a $\pi/2$ phase shift control circuit. This makes the advantages of the automatic phase shift control circuit described above further prominent.

Preferably, the automatic phase shift control circuit is formed from an integrated circuit wherein analog circuits of the balance type are integrated. This can reduce a phase shift error which originates from an integrated circuit wiring pattern.

According to a further aspect of the present invention, there is provided an equal amplitude addition circuit, comprising a first differential amplification circuit for amplifying a first addition signal inputted thereto, a second differential amplification circuit for amplifying a second addition signal inputted thereto, first conversion means for converting an output of the first differential amplification circuit into a signal of a predetermined level in accordance with a control signal, second conversion means for converting an output of the second differential amplification circuit into a signal of a predetermined level in accordance with the control signal, detection means for detecting output levels of the first and second conversion means, gain control means for generating the control signal in response to a detection signal of the detection means, and addition means for adding signals outputted from the first and second conversion means, the levels of the output signals of the first and second conversion means being controlled so as to be equal to each other in accordance with the control signal outputted from the gain control means.

With the equal amplitude addition circuit, even when inputted signals have different levels, they are controlled so that they are added with levels equal to each other. Accordingly, the equal amplitude addition circuit exhibits a very high advantage particularly where it is applied to an addition circuit of the type which adds two signals to remove unnecessary signal components.

Further, also where the equal amplitude addition circuit is formed on a semiconductor integrated circuit board, absolute dispersions of the elements which form the circuit can be absorbed by the circuitry which feeds back the signal of the detected output level. Consequently, the equal amplitude addition circuit can be produced with a reduced cost using a comparatively small number of elements, and where the equal amplitude addition circuit is applied, for example, to a television reception circuit of the image cancellation type or the like, an image signal can be removed effectively and adjustment operations therefor can be reduced remarkably, resulting in achievement in reduction of the cost.

The first conversion means may include third and fourth differential pairs connected such that the output of the first differential amplification circuit may serve as common emitter current of the third and fourth differential pairs, and the second conversion means may include fifth and sixth differential pairs connected such that the output of the second differential amplification circuit may serve as common emitter current of the fifth and sixth differential pairs. In this instance, the detection means may detect the output levels of the first and second conversion means by detecting an output of the fourth differential pair and an output of the sixth differential pair.

The control signal may be used to control gains of the first and second conversion means in the opposite directions to each other. This simplifies a control circuit which uses the control signal.

Preferably, the first addition signal and the second addition signal have a phase difference of 90 degrees from each other.

Preferably, the equal amplitude addition circuit is formed from an integrated circuit wherein analog circuits of the balance type are integrated. This can reduce a phase shift error which originates from an integrated circuit wiring pattern.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
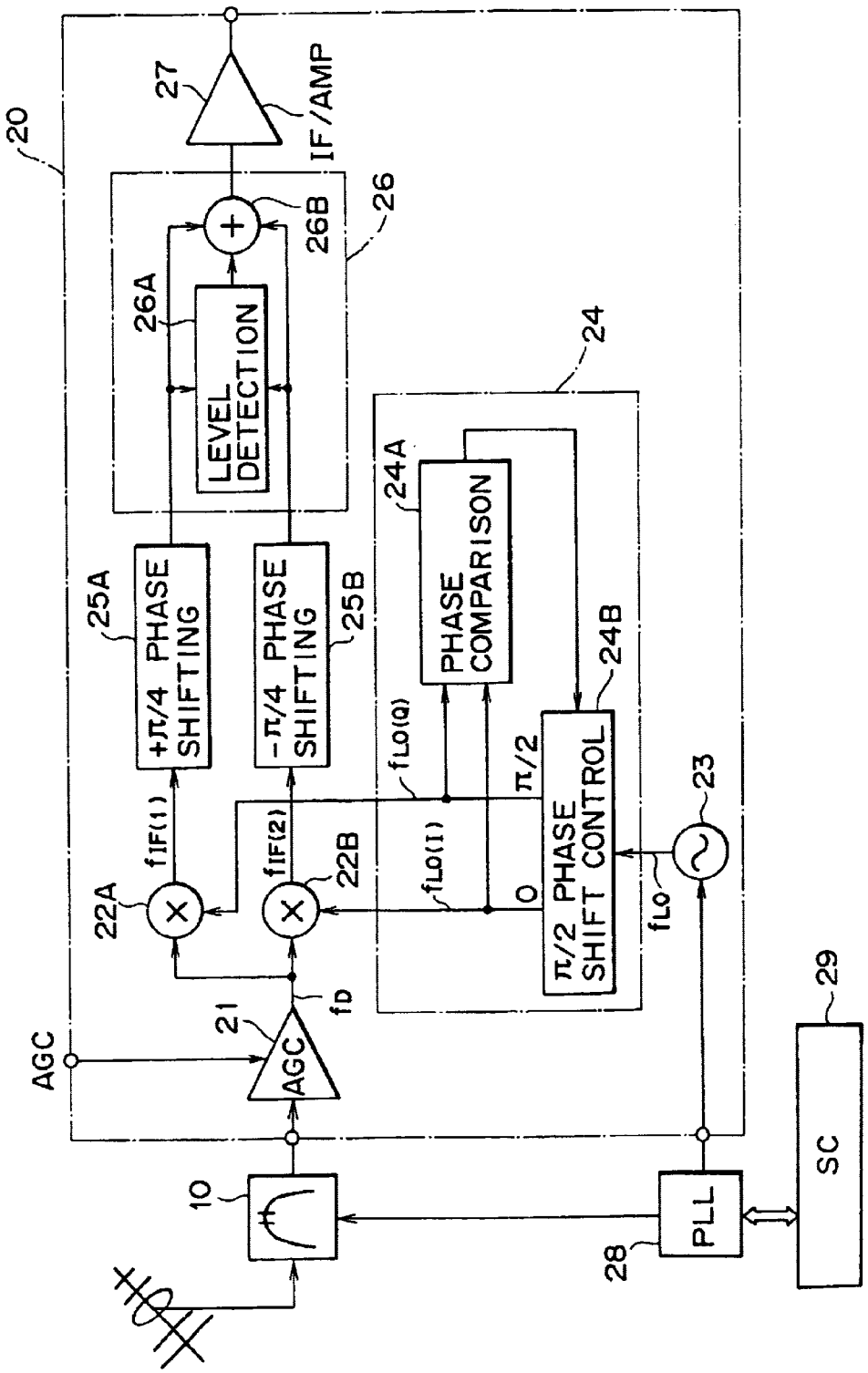
FIG. 1 is a block diagram of a television reception circuit to which the present invention is applied.

Referring first to FIG. 1, there is shown a television reception circuit to which the present invention is applied. Broadcasting signals inputted through an antenna, a cable or the like are supplied to a television variable frequency tuning circuit 10, by which a desired broadcasting channel is selected. A signal of the selected channel having, for example, a frequency fD is inputted to an integrated circuit 20 formed as an analog circuit.

The broadcasting signal inputted to the integrated circuit 20 is first amplified by an AGC (automatic gain controlled) amplifier 21 so that it has a predetermined signal level, and then supplied to first and second frequency mixers 22A and 22B.

Meanwhile, the first frequency mixer 22A and the second frequency mixer 22B receive local signals having a phase difference of 90 degrees from each other from a $\pi/2$ phase shifting circuit 24 which phase shifts an oscillation frequency fLo of a local oscillator 23. Consequently, difference components between the frequencies of the local signals and the frequency of the inputted selected channel are outputted as intermediate frequencies fIF(1) and fIF(2) from the first frequency mixer 22A and the second frequency mixer 22B, respectively.

The intermediate frequencies fIF(1) and fIF(2) outputted from the first frequency mixers 22A and 22B are supplied to a $+\pi/4$ phase shifting circuit 25A and a $-\pi/4$ phase shifting circuit 25B, respectively, and then added as signals of an equal level by an addition circuit 26. Consequently, a resulting signal is outputted as a combination signal from the addition circuit 26 to an intermediate frequency amplification circuit 27.

The addition circuit 26 is composed of a level detection circuit 26A for detecting a level difference between output signals of the $+\pi/4$ and $-\pi/4$ phase shifting circuit 25A and 25B inputted thereto, and an adder 26B for adding the output signals of the $+\pi/4$ and $-\pi/4$ phase shifting circuit 25A and 25B with levels equal to each other based on a detection output of the level detection circuit 26A.

A PLL (Phase-Locked Loop) circuit 28 for forming a local oscillation frequency used in the television receiver is connected to the television variable frequency tuning circuit 10. The PLL circuit 28 forms an accurate local oscillation frequency based on a reference signal frequency source and finely adjusts the pass frequency of the television variable frequency tuning circuit 10 based on information corresponding to the local oscillation frequency and by control by an AFT system.

A system controller 29 for effecting a channel selection operation of the television receiver and controlling the entire television receiver is connected to the PLL circuit 28.

The television reception circuit described above employs a mixing system wherein the local frequencies fLo(1) and fLo(2) having phases shifted by 90 degrees from the frequency fD of the selected channel are supplied to the first and second frequency mixers 22A and 22B so that they are multiplied by the selected frequency fD. Consequently, even if an image disturbing frequency fIM is present, it can be cancelled so that a disturbing wave which is produced with this frequency component may not be outputted as described below.

Where the signal of the desired selected channel is represented by $A\cos(\omega st+\phi s)$, the frequency which makes an image disturbance is represented by $B\cos(\omega it+\phi i)$ and the local frequency is represented by $\cos(\omega Lt+\phi L)$, the output frequency fMIX(1) of the first frequency mixer 22A is given by the following expression (1):

$$f_{MIX(1)} = \{A \cdot \text{Cos}(\omega st + \phi S) + B \cdot \text{Cos}(\omega it + \phi i)\} \times \text{Cos}(\omega Lt + \phi L) \quad (1)$$
$$= A/2 \cdot \text{Cos}\{(\omega s + \omega L)t + \phi s + \phi L\} + A/2 \cdot$$
$$\text{Cos}\{(\omega s - \omega L)t + \phi L - \phi s\} + B/2 \cdot \text{Cos}\{(\omega i + \omega L)t +$$
$$\phi i + \phi L\} + B/2 \cdot \text{Cos}\{(\omega i - \omega L)t + \phi i - \phi L\}$$

Then, if an operation output of the expression (1) above is passed through a low-pass filter or a like element to extract only a difference signal component ($\omega S-\omega L$), then such an intermediate frequency fIF(1) as given by the following expression (2):

$$f_{IF(1)} = A/2 \cdot \text{Cos}\{(\omega_L-\omega_s)t+\phi_L-\phi_s\}+B/2 \cdot \text{Cos}\{(\omega_i-\omega_L)t+100_i-\phi_L\} \quad (2)$$

$$f_{IF(1)}(\pi/2) = A/2 \cdot \text{Sin}\{(\omega_L-\omega_s)t+\phi_L-\phi s\}+B/2 \cdot \text{Sin}\{(\omega_i-\omega_L)t+\phi_i-\phi_L\} \quad (3)$$

is outputted.

Meanwhile, the second frequency mixer 22B receives a frequency $\sin(\omega Lt+\phi L)$ having a phase shifted by $\pi/2$ from that of the corresponding local frequency. Therefore, by operation similar to that of the expression (1), the mixed output frequency fMIX(2) of the second frequency mixer 22B is given by the following expression (4):

$$f_{MIX(2)} = \{A \cdot \text{Cos}(\omega_{st} + \phi_s) + B \cdot \text{Cos}(\omega_t + \phi_i)\} \times \text{Sin}(\omega_{Lt} + \phi_L) \quad (4)$$
$$= A/2 \cdot \text{Sin}\{(\omega_L - \omega_s)t + \phi_L + \phi_s\} + A/2 \cdot$$
$$\text{Sin}\{(\omega_s + \omega_L)t + \phi_i + \phi_L\} + B/2 \cdot \text{Sin}\{(\omega_i + \omega_L)t +$$
$$\phi_i + \phi_L\} - B/2 \cdot \text{Sin}\{(\omega_i - \omega_L)t + \phi_i - \phi_L\}$$

Also in this instance, if the mixed output frequency fMIX(2) is passed through a low-pass filter to extract a difference signal component, then such an intermediate frequency signal fIF(2) as given by the following expression (5):

$$f_{IF(2)} = A/2 \cdot \text{Sin}\{(\omega_L-\omega_s)t+\phi_L-\phi_s\}-B/2 \cdot \text{Sin}\{(\omega_i-\omega_L)t+100_i-\phi_L\} \quad (5)$$

is outputted.

If the signal components of the expressions (2) and (5) are compared with each other, then since the two signal components are each formed from two signal components which have a phase difference of π/2 from each other, if the signal components of the expressions (2) and (5) are supplied to phase shifting circuits which provide a phase difference of π/2 to the signal components, that is, in the circuit of FIG. 1, if one of the signal components is supplied to the +π/4 phase shifting circuit 25A which shifts the phase of it by π/4 while the other signal component is supplied to the −π/4 phase shifting circuit 25B which shifts the phase of it by −π/4, then the expression (2) is changed to another expression (3) given hereinabove. Consequently, the two resulting signals have phases shifted by π/2 from each other.

Thus, since the expression (3) and the second term of the expression (5) indicate signals same as each other although the polarities thereof are different from each other, if the two signals fIF(1)(π/2) and fIF(2) are added by an addition circuit, then a signal A*sin{(ωL−ωs)t+øL−øs} whose intermediate frequency is given only as a difference signal between the desired selected frequency fD(ωD) and the local frequency fL(ωL) as given by the following expression (6):

$$f_{IF} = A\sin\{(\omega_L - \omega_s)t + \phi_L - \phi_s\} \quad (6)$$

Since the output of the addition circuit 26 does not include a signal component of the intermediate frequency fIM which makes a disturbing wave, no image signal component is included in the output of the intermediate frequency amplification circuit 27, and consequently, the picture quality of the video signal after demodulation is not deteriorated.

Further, if signal processing is performed by the integrated circuit described above where it is formed as a push-pull type circuit (balance circuit) using, for example, a differential amplifier as a basic component, then second order harmonic distortion of a signal component can be eliminated. Further, even if a frequency which makes somewhat disturbing to an image is inputted on the input side, an image intermediate frequency can be removed sufficiently. Consequently, the integrated circuit is advantageous in that the channel selection circuit on the input side can be simplified.

By the way, with such a reception circuit of the image cancellation type as described above, while the π/2 phase shifting circuit 24 can provide local frequencies having a phase difference of accurately 90 degrees from each other as seen from the expressions (1) to (6) given hereinabove, it is not practical to implement such an integrated circuit that performs π/2 phase shifting completely within a frequency region which is such a high frequency band as of a television broadcasting wave since a manufacturing technique of a high degree accuracy and a complicated circuit construction are required.

Therefore, in the television reception circuit described above with reference to FIG. 1, the π/2 phase shifting circuit 24 includes a phase comparison circuit 24A for comparing the phases of signals after and before phase shifted by the π/2 phase shifting circuit 24 with each other to detect a phase difference between them, and a π/2 phase shift control circuit 24B for controlling a phase shift amount using a constant current source circuit. In the π/2 phase shifting circuit 24, a phase error signal outputted from the phase comparison circuit 24A is fed back to the π/2 phase shift control circuit 24B so that two local signals having a phase difference which remains π/2 in all local frequencies may be outputted from the π/2 phase shifting circuit 24.

It is to be noted that the equal amplitude addition circuit described above with reference to FIGS. 11 to 16A and 16B can be applied as the addition circuit 26 of the television reception circuit described hereinabove with reference to FIG. 1 so that suppression of an image frequency can be achieved effectively.

More particularly, the phase comparison circuit 24A is formed from a multiplication circuit which employs a differential amplifier and multiplies an ac signal sinωt before phase sifted and another ac signal sin(ωt+π/2+ø) after phase shifted to obtain a value of a dc component sinø corresponding to a phase difference ø between the signals.

Then, the time constant of the CR circuit which forms the π/2 phase shift control circuit 24B is electrically controlled in accordance with the dc component sinø so that the phase error ø may always be equal to 0.

Figure 2:
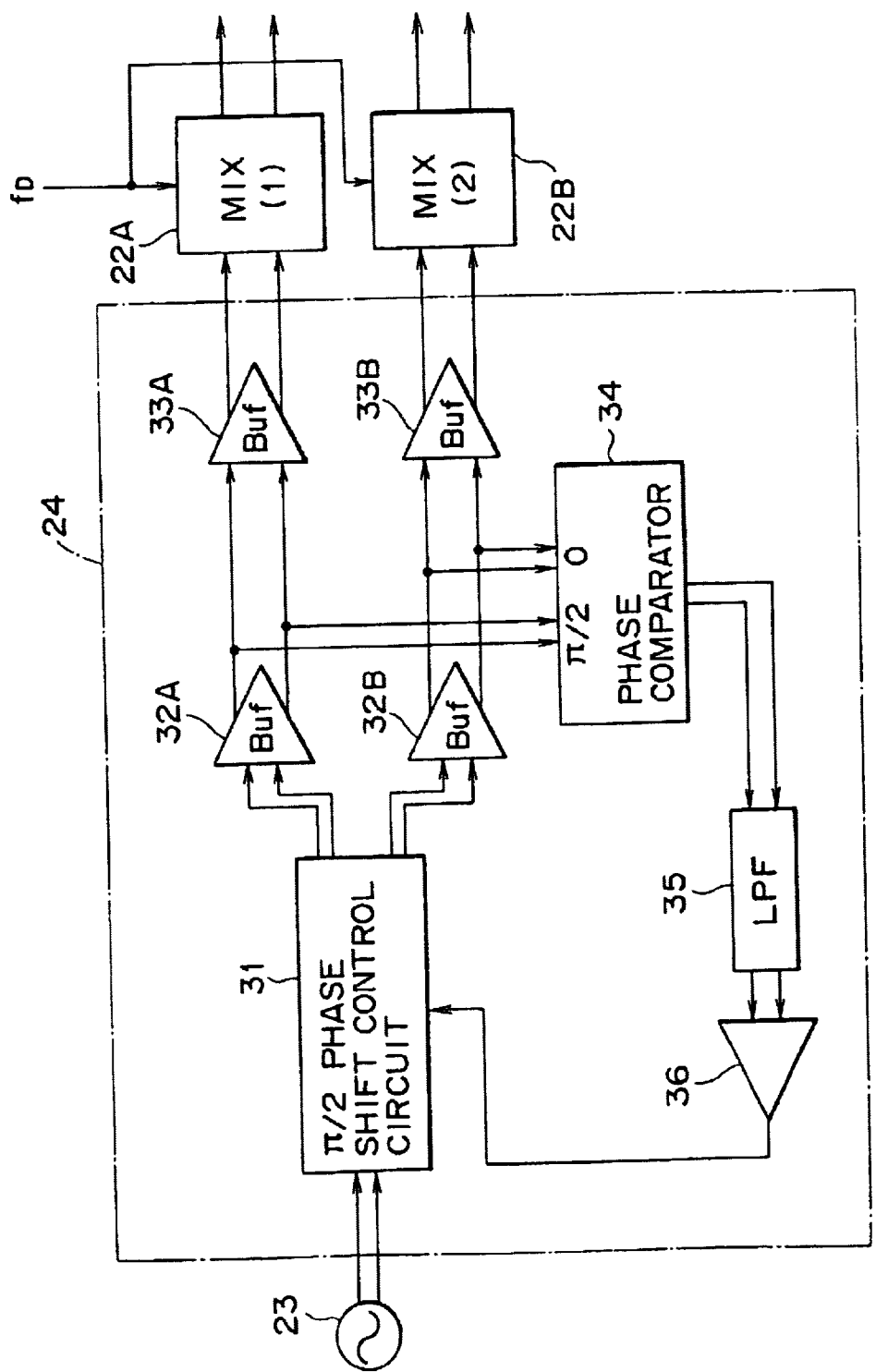
FIG. 2 is a block diagram showing a construction in principle of a phase shifting circuit employed in the television reception circuit of FIG. 1.

FIG. 2 shows in block diagram an example of a form of the π/2 phase shifting circuit 24 described above. Referring to FIG. 2, the π/2 phase shifting circuit 24 shown includes a π/2 phase shift control circuit 31 formed from a time constant circuit which is charged by a variable current source, a pair of output buffers 32A and 32B for extracting and outputting local signals having a phase difference of π/2 from each other as balance signals, a pair of input buffers 33A and 33B for supplying the local signals to the first and second frequency mixers 22A and 22B, respectively, a phase comparator 34, a low-pass filter 35 for outputting an average value of a phase difference signal, and a phase error amplifier 36.

The phase comparator 34 can be formed from a multiplication circuit which multiplies two local frequencies inputted thereto. A phase error (sinΔø) by which the phase difference between the two local signals is displaced from π/2 is detected based on an operation output of the multiplication. Then, the phase error signal is averaged by the low-pass filter 35 so that it is outputted as a dc signal. The dc signal is amplified by the error amplifier 36. Then, the current to flow to, for example, an integration circuit which forms the π/2 phase shift control circuit is controlled in accordance with an output of the error amplifier 36. Consequently, the phase shift amount of the π/2 phase shift control circuit 31 is feedback controlled so that it may always be π/2.

Further, in the television reception circuit of FIG. 1 described above, if the levels of signals inputted to the addition circuit 26 which adds mixed signals to remove an image component are not equal to each other, then an image component cannot be cancelled completely.

Figure 3:
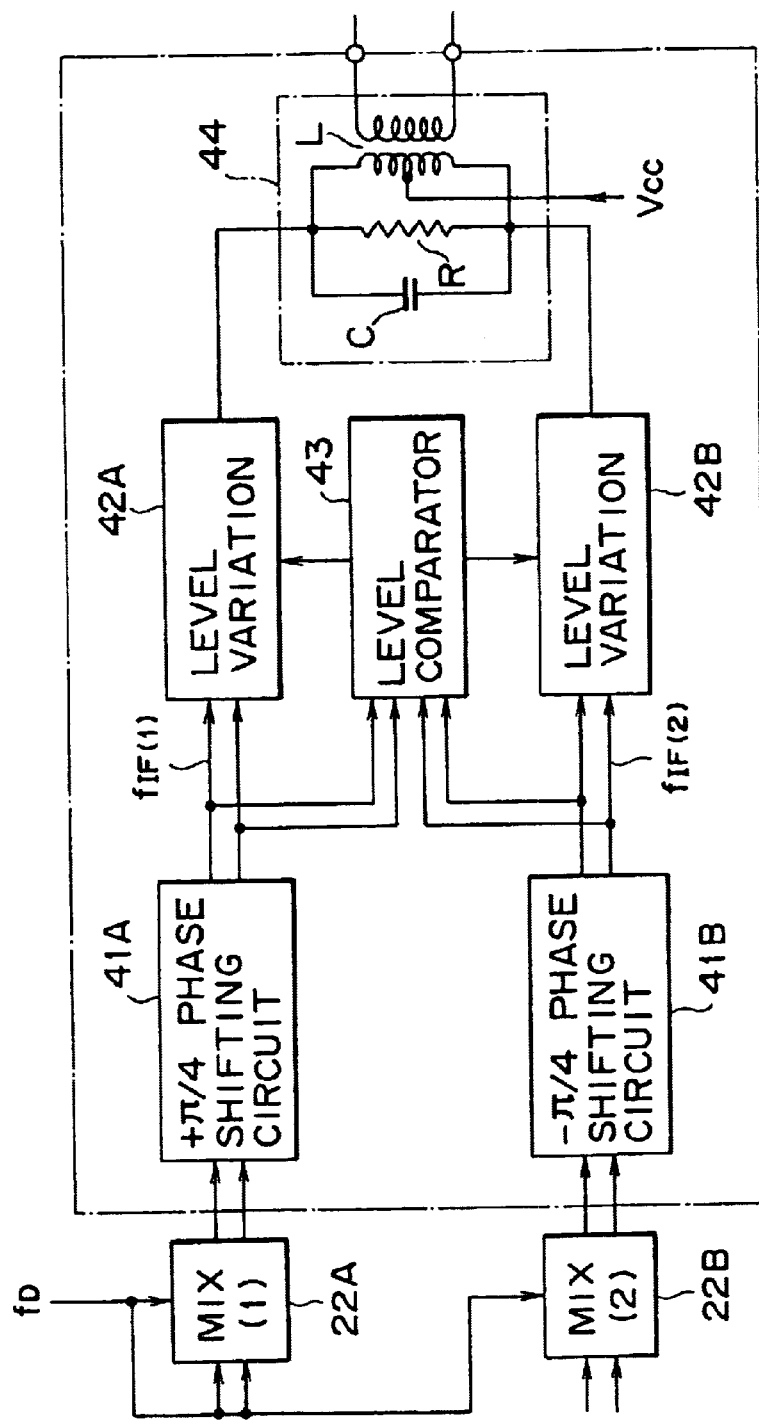
FIG. 3 is a block diagram of an addition circuit for cancelling an image frequency which can be used in the television reception circuit of FIG. 1.

Therefore, the addition circuit 26 is particularly constructed in such a manner as shown in FIG. 3. Referring to FIG. 3, the addition circuit 26 shown includes a +π/4 phase shifting circuit 41A and a −π/4 phase shifting circuit 41B which balance input and output the outputs of the first and second frequency mixers 22A and 22B, respectively, and a pair of level variation circuits 42A and 42B to which intermediate frequency components extracted by the +π/4 phase shifting circuit 41A and the −T/4 phase shifting circuit 41B are supplied, respectively.

The level variation circuits 42A and 42B are adjusted so that output signals equal to each other may be obtained therefrom by controlling the gains of differential amplifiers of the gain adjustment type. Here, the level variation circuits 42A and 42B are constructed such that such adjustment thereof is performed by manual adjustment of the gains of the differential amplifiers.

Alternatively, the level variation circuits 42A and 42B may be controlled so that the output levels thereof may be equal to each other based on a detection value of a level comparator 43 which detects the signals to be inputted to the level variation circuits 42A and 42B.

In this instance, the level variation circuits 42A and 42B may be feedback controlled so that the output levels thereof may become equal to each other based on the levels detected on the output sides of the level variation circuits 42A and 42B.

The outputs of the level variation circuits 42A and 42B are added by a tank circuit 44 formed from a coil L and a capacitor C such that it has a suitable bandwidth and is tuned with an intermediate frequency. An output of the tank circuit 44 is supplied to the intermediate frequency amplification circuit 27.

Figure 4:
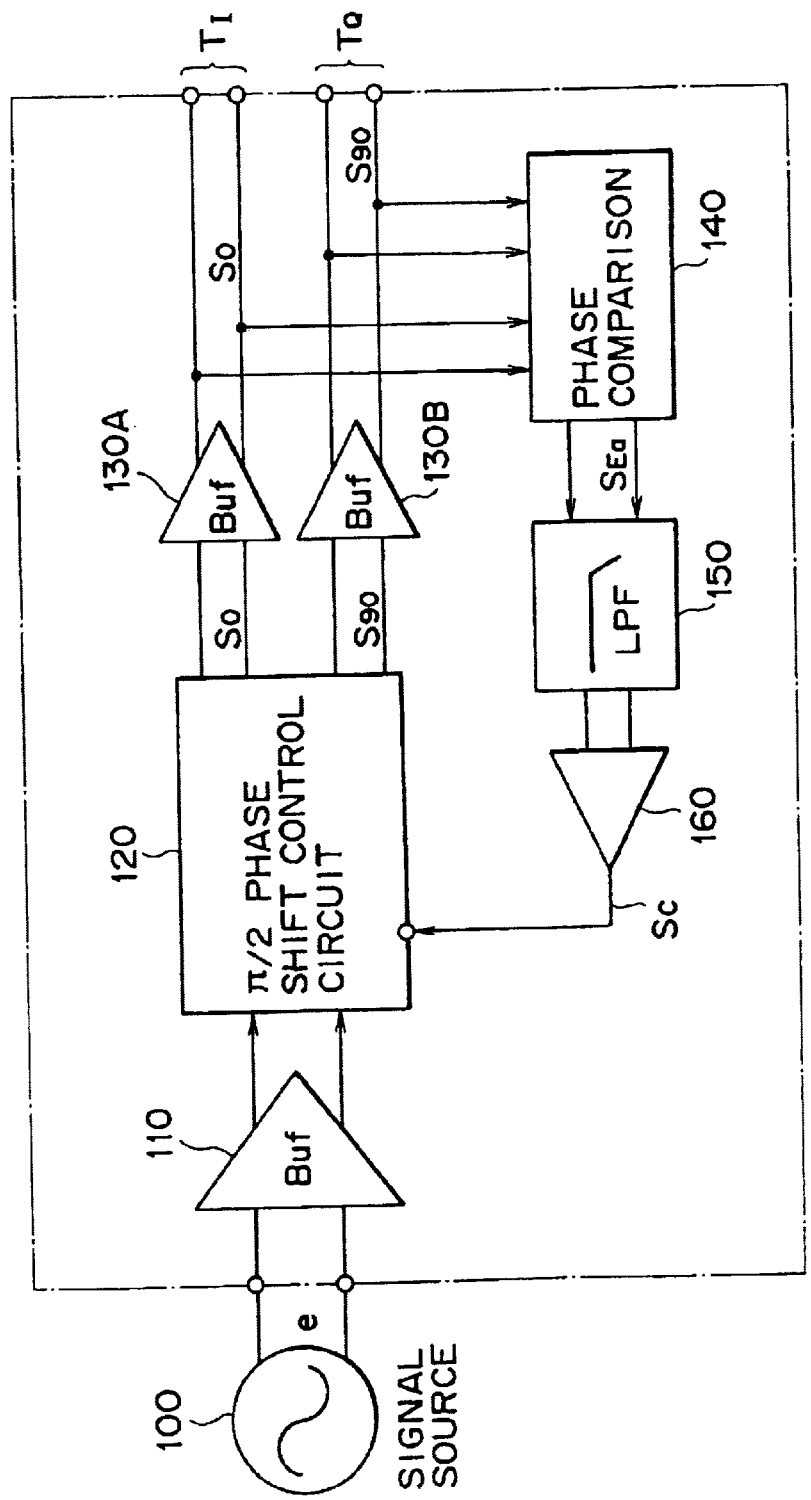
FIG. 4 is a block diagram showing a general construction of an automatic phase shift control circuit to which the present invention is applied.

Referring now to FIG. 4, there is shown in block diagram an automatic phase shift control circuit to which the present invention is applied. The automatic phase shift control circuit can be applied to the television reception circuit described hereinabove with reference to FIG. 1.

The automatic phase shift circuit includes a signal source 100, an input buffer circuit 110, and a phase shift control circuit 120 for forming a phase shift signal.

The phase shift control circuit 120 in the automatic phase shift circuit of FIG. 4 is formed as a phase shift control circuit for $\pi/2$ (90 degrees) as hereinafter described.

The automatic phase shift circuit further includes a pair of output buffer circuits 130A and 130B to which to balance output signals between which a predetermined phase difference is provided by the phase shift control circuit 120 are inputted. Outputs of the output buffer circuits 130A and 130B are supplied as balance signals from output terminals T(I) and T(Q), respectively, to other circuits and supplied also to a phase comparison circuit 140.

The phase comparison circuit 140 compares the phase of an output signal having a phase shifted by the phase shift control circuit 120 and the phase of the signal prior to such phase shifting with each other and outputs a signal corresponding a phase difference between them. For example, if the phase shift amount by the phase shift control circuit 120 is $\pi/2$, then the phase comparison circuit 140 detects a value corresponding to $\pm\Delta\emptyset$ by which the output signal of the phase shift control circuit 120 is displaced from $\pi/2$, and outputs a signal representative of the value to a filter (LPF) 150 of the low-pass type in the next stage.

The filter 150 of the low-pass type thus detects an average dc component and supplies a signal representing the average dc component as a control signal to the phase shift control circuit 120 through an error amplifier 160.

The phase shift control circuit 120 is formed from, as hereinafter described in more detail, a combination of a filter of the low-pass type and another filter of the high-pass type such that the phase shift amount by the phase shift control circuit 120 is varied by controlling values of current to be supplied to resistor and capacitor circuits which form the filter of the low-pass type and the filter of the high-pass type.

The phase comparison circuit 140 is formed from a multiplication circuit which employs a differential amplifier. If the phase shift amount is set, for example, to $\pi/2$, then the phase comparison circuit 140 multiplies an ac signal $\sin\omega t$ prior to phase shifting and another ac signal $\sin(\omega t+\pi/2+\emptyset)$ after the phase shifting to determine a value corresponding to the phase difference $\emptyset$. Where the phase shifting circuit effects phase shifting by $\pi/2$, the phase comparison circuit 140 determines a signal $SM=1/2\{(\sin 2\omega t+\emptyset)+\sin\emptyset\}$ from a product of $\sin\omega t$ and $\cos(\omega t+\emptyset)$.

Then, the value of the dc component $\sin\emptyset t$ which corresponds to the phase error can be determined by removing ac components by means of the filter 150 in the next stage.

The dc component is amplified by the error amplifier 160 to produce a control signal SC, which is fed back to the phase shift control circuit 120 so as to be used to control the phase shift amount by the phase shift control circuit 120 so that the phase error $\emptyset$ may be reduced ($\emptyset=0$).

As a result, the phase shift amount by the phase shift control circuit 120 is set by the feedback control so that the phase error $\emptyset$ may be reduced to $\emptyset=0$. Consequently, two signals S0 and S90 which have a phase difference of $\pi/2$ from each other can be obtained at the outputs of the phase shift control circuit 120.

Figure 5:
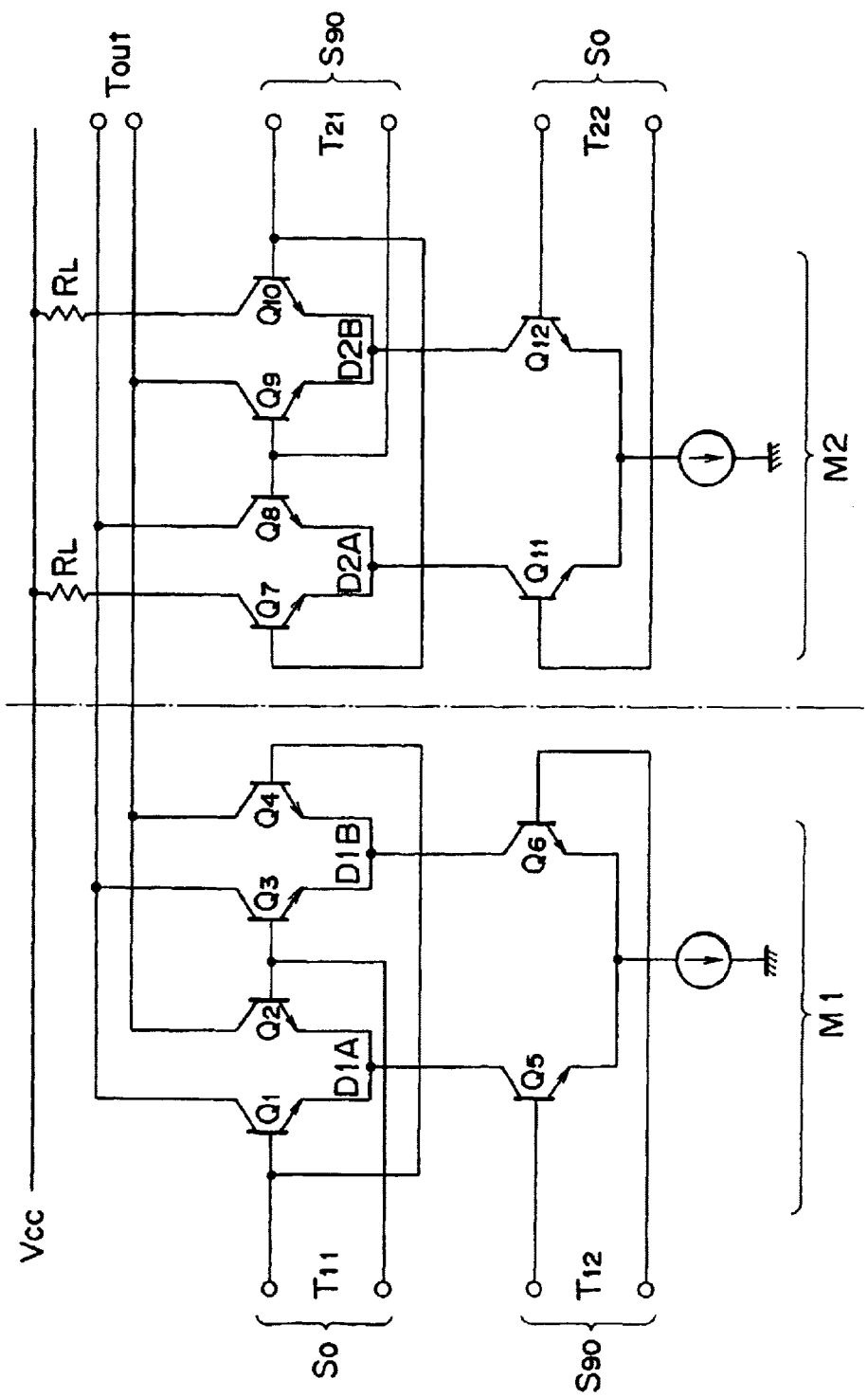
FIG. 5 is a circuit diagram showing a detailed construction of a phase comparison circuit for producing a signal for controlling the automatic phase shift control circuit of FIG. 4.

FIG. 5 shows an example of a detailed construction of the phase comparison circuit 140 shown in FIG. 4.

Referring to FIG. 5, the phase comparison circuit 140 shown includes a first multiplier M1 which in turn includes a first differential amplifier D1A composed of transistors Q1 and Q2, a second differential amplifier D1B composed of transistors Q3 and Q4, and a third differential amplifier composed of transistors Q5 and Q6 for controlling the common emitters of the transistors Q1, Q2 and Q3, Q4.

Further, in order to maintain the balance with the first multiplier M1, the phase comparison circuit 140 includes a second multiplier M2 which in turn includes a fourth differential amplifier D2A composed of transistors Q7 and Q8, a fifth differential amplifier D2B composed of transistors Q9 and Q10, and a sixth differential amplifier composed of transistors Q11 and Q12 for controlling the common emitters of the transistors Q7, Q8 and Q9, Q10.

A signal S0 before phase shifted is supplied from input terminals T11 to the differential amplification circuits DA1 and DA2 in pair which form the first multiplier M1, and a signal S90 after phase shifted is supplied from input terminals T12 to the transistors Q5 and Q6 in pair which form the third differential amplifier and controls the current to the common emitters of the transistors Q1 to Q4.

Meanwhile, the signal S90 after phase shifted is inputted from input terminals T21 to the differential amplifiers D2A and D2B in pair which form the second multiplier M2, and the signal S0 before phase shifted is supplied from input terminals T22 to the transistors Q11 and Q12 which control the current to the common emitters of the transistors Q7 to Q10.

Then, signals obtained by the operations of the two multipliers are combined by load resistors RL and outputted to output terminals Tout.

While the two multipliers M1 and M2 multiply the signals S0 and S90 inputted thereto and having a phase difference of $\pi/2$, if S0=$\sin\omega t$ and S90=$\cos(\omega t\pm\emptyset)$ as described above, an operation output regarding the phase error $\emptyset$ between them is outputted from the terminals Tout. Thus, a dc component of the output signal is extracted by the low-pass filter 150 in the next stage, and the dc component signal is transmitted through the error amplifier 160 to the phase shift control circuit 120, in which it is used to control the phase shift amount by the phase shift control circuit 120.

Figure 6:
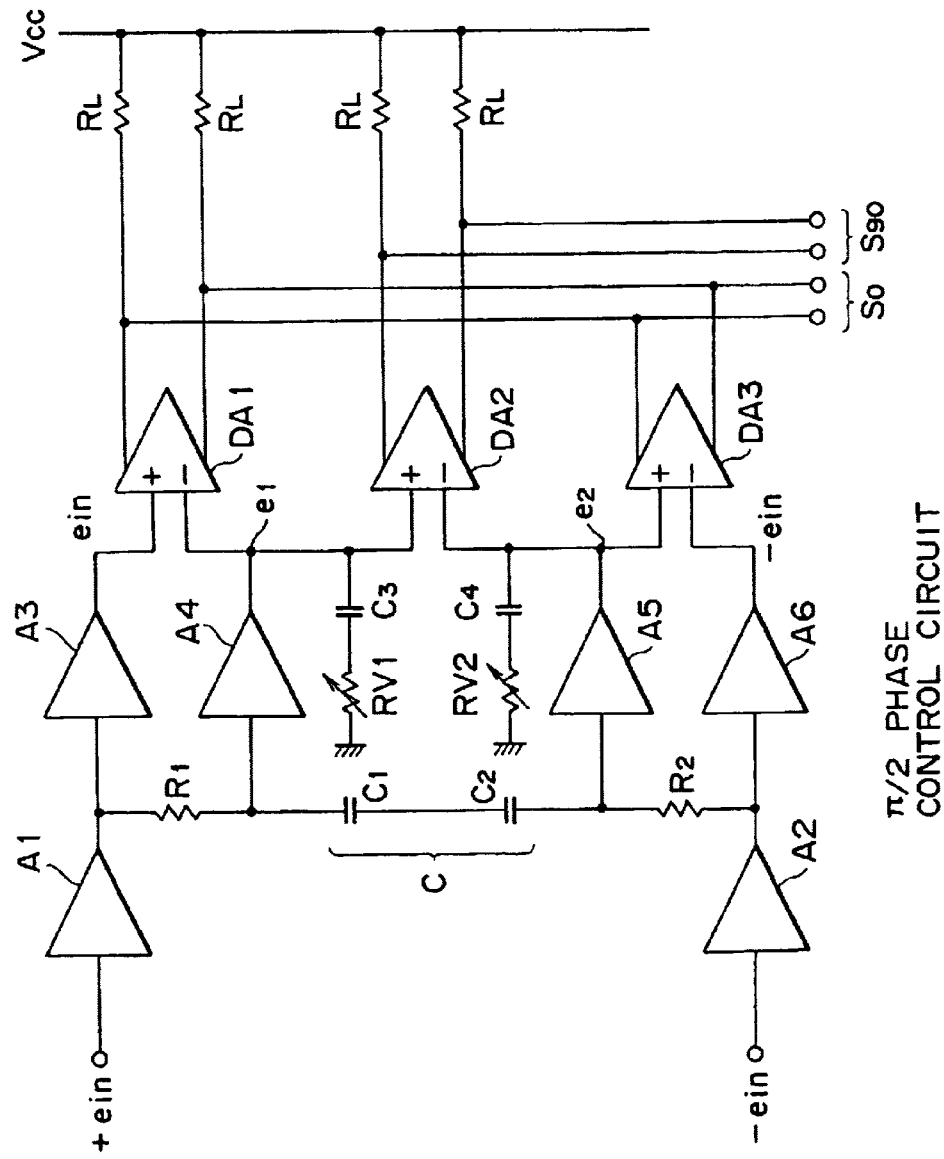
FIG. 6 is a block diagram of a phase shift control circuit of the automatic phase shift control circuit of FIG. 4 wherein the phase shift amount can be controlled in response to a signal inputted from the outside.

FIG. 6 shows an example of a detailed construction of the phase shift control circuit 120 where it is formed particularly so as to effect phase shifting by $\pi/2$ (hereinafter referred to as 90 degrees). Referring to FIG. 6, the phase shift control circuit 120 shown includes amplifiers A1 to A6 each of which has a buffer action and may have a gain equal to 1. The phase shift control circuit 120 further includes differential amplifiers DA1 to DA3.

Input ac signals ein and −ein which are balance signals are supplied to the amplifiers A1 and A2, respectively. A signal S90 having a phase shifted by $\pi/2$ is outputted at an output of the differential amplifier DA2 while a combined output of the differential amplifiers DA1 and DA3 is outputted as a signal S0 which is used as a reference phase signal.

The $\pi/2$ phase shift control circuit 120 receives the balance signals ein and −ein from input terminals thereof and divides a difference between them using resistors R1 and R2 and a capacitor C (C1+C2).

Then, voltages obtained by division by the capacitor C and the resistors R1 and R2 and having a phase difference therebetween are outputted through the amplifiers A3 to A6.

Where the voltage corresponding to the terminal of the resistor R1 is represented by eR1, the terminal voltage of the capacitor C is represented by eC and the terminal voltage of the resistor R2 is represented by eR2, the voltages eR1, eC and eR2 outputted from the differential amplifiers DA1, DA2 and DA3 are represented by the following expressions (7), (8) and (9):

$$e_{R1} = \frac{j\omega C R_1}{1 + j\omega C(R_1 + R_2)} \quad (7)$$

$$e_{N2} = \frac{j\omega C R_2}{1 + j\omega C(R_1 + R_2)} \quad (8)$$

$$C_c = \frac{1}{1 + j\omega C(R_1 + R_2)} \quad (9)$$

Here, if the resistors R1 and R2 and the capacitor C are set so as to satisfy R1=R2=1/ω1C (where W1 is a frequency of a particular input ac signal), then when the frequency of the input signal is ω1, the signal levels of the voltages satisfy eR1+eR2≈eC, and the phase difference between the voltage eC which outputs a voltage between the opposite terminals of the capacitor C and the voltage eR1 +eR2 which outputs a terminal voltage between the opposite ends of the resistors R1 and R2 can be made equal to J, that is, substantially equal to π/2, and the levels of the signals S0 and S90 can be made substantially equal to zero.

It is to be noted that, in any frequency other than ω1, the levels do not become equal to each other, but the phase difference becomes equal to π/2.

If the time constants of a volume resistor RV1 and a capacitor C3 which form a low-pass filter and another volume resistor RV2 and another capacitor C4 which form another low-pass filter are adjusted, then the phase difference π/2 can be further phase shifted by ±ø. As hereinafter described, by electrically adjusting the values of the volume resistors RV1 and RV2, the phase difference between the two output voltages S0 and S90 can be controlled to π/2±ø.

Consequently, the phase shift control circuit outputs, from an output terminal T0 thereof, the signal S0 and outputs, from another output terminal T90, the signal S90 which has a phase different by 90 degrees from the signal S0.

It is to be noted that the middle point between the capacitors C1 and C2 imaginarily exhibits a ground potential, and although a single capacitor may be used instead of them, provision of the separate capacitors C1 and C2 provides an advantage that, when they are formed as an integrated circuit, they provide a good balance to the circuit.

Figure 7:
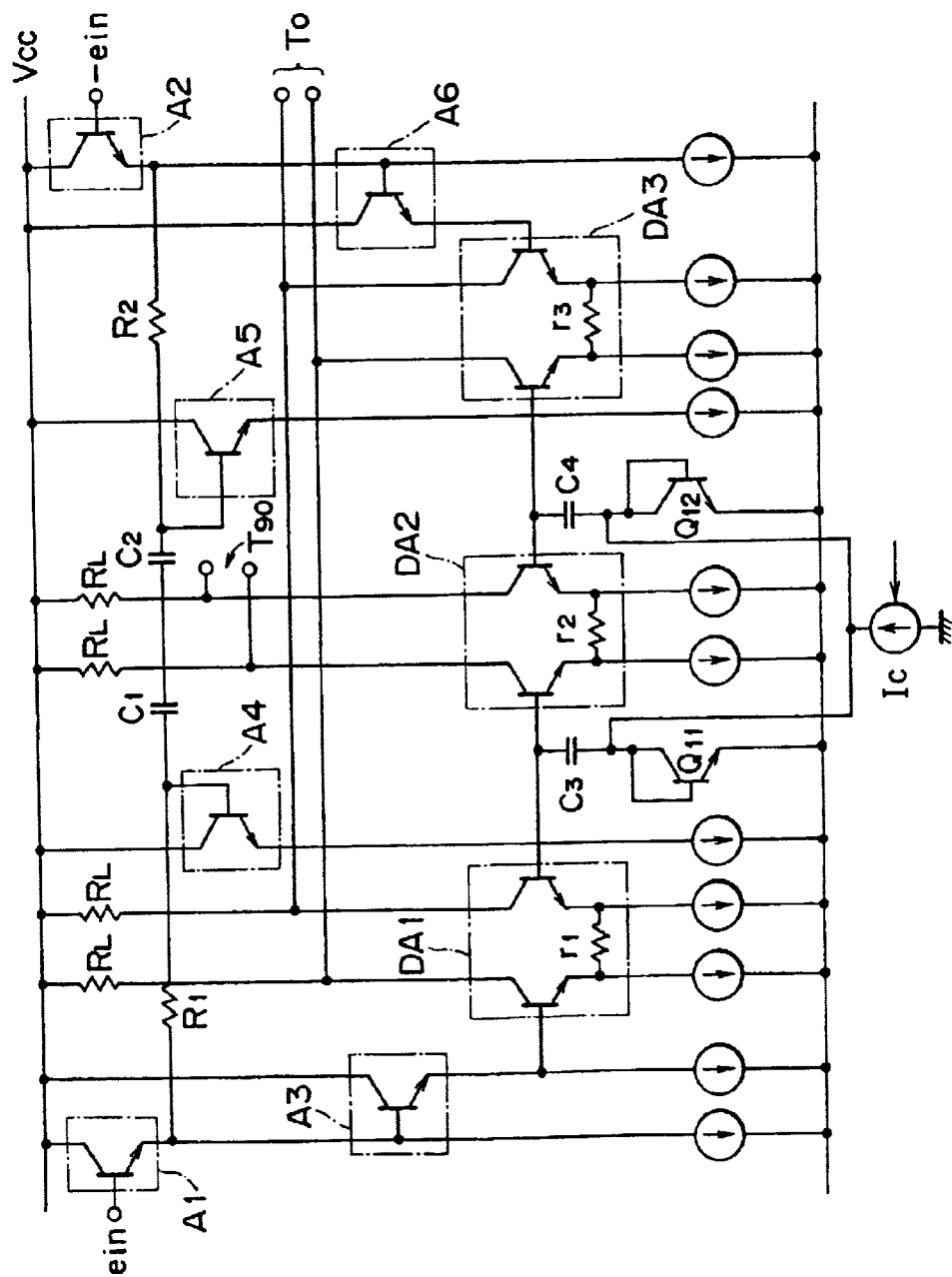
FIG. 7 is a circuit diagram of an integrated circuit showing an example of a detailed circuit construction which realizes the phase shift control circuit shown in FIG. 6.

FIG. 7 shows the π/2 phase shift control circuit shown in FIG. 6 where it is formed as an integrated circuit. Referring to FIG. 7, elements surrounded by alternate long and short dash lines represent the amplifiers A1 to A6 and the differential amplifiers DA1 to DA3 of FIG. 6. As seen from FIG. 7, each of the amplifiers A1 to A6 is formed as an emitter follower circuit of transistors and formed so as to have a gain equal to 1.

Further, each of the differential amplifiers DA1 to DA3 is formed from a differential pair of transistors.

Furthermore, a volume VR1 and another VR2 for performing phase control are formed from the transistors Q11 and Q12, respectively, and the currents to the transistors Q11 and Q12 are varied by controlling a variable current source IC with an output of the error amplifier 160 so that the phase shift amounts of the signals S0 and S90 obtained from the output terminals T0 and T90 may be varied by 90 degrees±ø.

Figure 8:
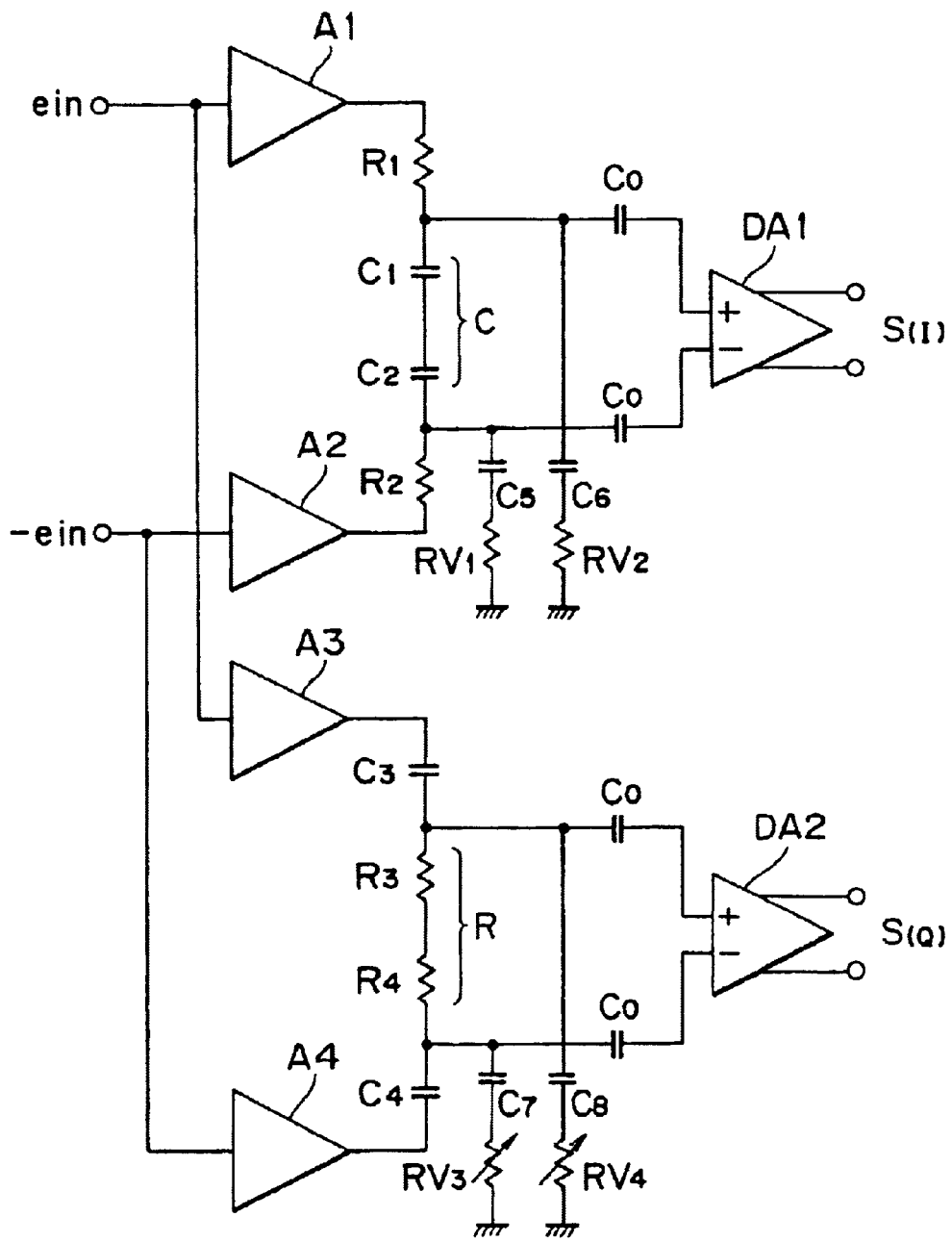
FIG. 8 is a circuit diagram showing another example of the phase shift control circuit shown in the automatic phase shift control circuit of FIG. 4.

It is to be noted that the π/2 phase shift control circuit may be constructed not in such a manner as shown in FIG. 6 but in such a manner as shown in FIG. 8. Referring to FIG. 8, the π/2 phase shift control circuit shown includes a first time constant circuit formed from resistors R1 and R2 and a capacitor C (C1+C2), and a second time constant circuit formed from resistors R3 and R4 and capacitors C3 and C4 and formed as an inverse circuit to the first time constant circuit. Input signals ein and −ein are supplied to the first and second time circuits through amplifiers A1 to A4, respectively, and outputs at voltage dividing points of the first and second time constant circuits are extracted by differential amplifies DA1 and DA2 through a coupling capacitor Co, respectively.

In the π/2 phase shifting circuit, by individually setting the resistors R1 to R4 and the capacitors C, C3 and C4 to predetermined resistance and capacitance values, an output signal S(1) exhibits a lead of π/4 with respect to the input signal ein while another output signal S(Q) exhibits a lag of π/4 with respect to the input signal ein, and consequently, signals having a phase difference of π/2 from each other are obtained. Here, if capacitors C5 to C8 and volume resistor RV1 to RV4 for adjustment are provided and time constants of them are controlled, then the phase shift amount of π/2 can be adjusted.

Further, this circuit can be used for phase shifting circuits 25A and 25B for +π/4 and −π/4 of a television reception circuit as hereinafter described.

Figure 9:
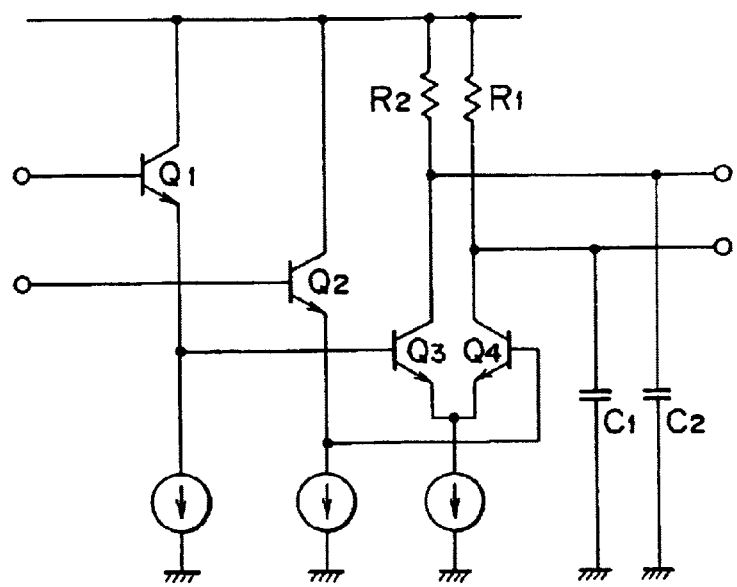
FIG. 9 is a circuit diagram showing a filter of the extraction low pass type which is employed in the phase comparison circuit of FIG. 5 and through which a comparison signal is passed.

FIG. 9 shows a form of the phase comparison circuit shown in FIG. 5. Referring to FIG. 9, the operation outputs of the phase comparison circuit 140 are inputted to two transistors Q1 and Q2 which form emitter followers. Emitter output voltages of the transistors Q1 and Q2 are amplified by transistors Q3 and Q4, respectively, which form a differential pair circuit.

Each of output voltages of the transistors Q3 and Q4 of the differential pair is passed through a low-pass filter composed of a resistor R1 (R2) and a capacitor Cl (C2) so that high frequency components thereof are suppressed. Consequently, a dc component (sin (±π)) is extracted from ac components outputted from the phase comparison circuit 140.

Figure 10:
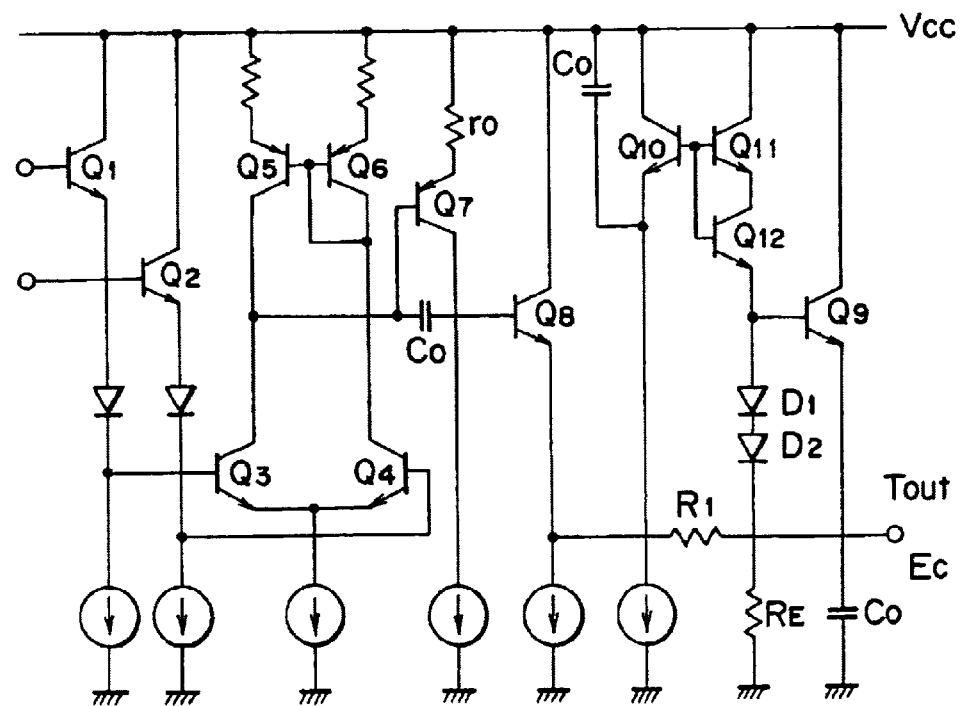
FIG. 10 is a circuit diagram showing a phase shift error amplifier employed in the automatic phase shift control circuit of FIG. 4 for amplifying a phase shift error signal.

FIG. 10 shows a form of the error amplifier 160 which amplifies the output of the filter 150 described above.

Referring to FIG. 10, also in the present error amplifier 160 shown, error signal components are inputted to two transistors Q1 and Q2 formed as emitter followers, and outputs of the transistors Q1 and Q2 are amplified by transistors Q3 and Q4, respectively, which form a differential pair.

Transistors Q5 and Q6 form a current mirror circuit, and a differential signal flowing through the differential pair is outputted to an output terminal Tout through transistors Q7 and Q8. The output at the output terminal Tout is used as a control signal EC to control, in the circuit shown in FIG. 7, the variable current source IC to adjust the phase shift amount.

A capacitor C0 is provided for suppressing high frequency components and used to prevent high frequency components from being fed back thereby to keep the stability of the automatic phase shift control circuit.

Transistors Q9, Q10, Q11 and Q12 and diodes D1 and D2 form a level shifting circuit which adds a bias voltage of, for example, approximately 0.8 V to the output terminal Tout and are provided so that operation of the variable current source IC may not have an offset.

It is to be noted that the automatic phase shift control circuit described with reference to FIGS. 4 to 10 may be applied as the π/2 phase shifting circuit 24 such that two local signals having a local frequency and having an accurate phase difference of π/2 are outputted therefrom.

Figure 11:
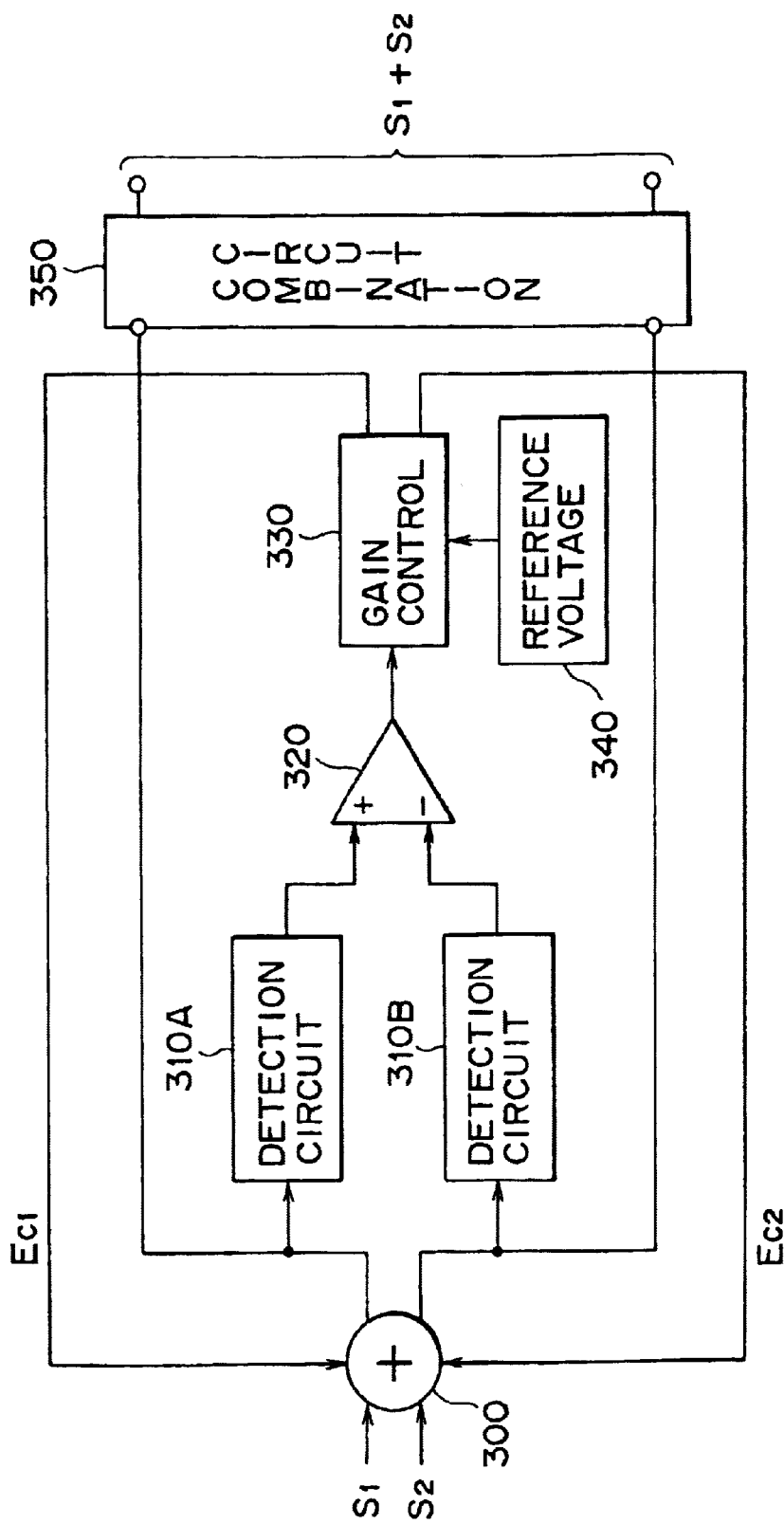
FIG. 11 is a block diagram showing a general construction of an equal amplitude addition circuit to which the present invention is applied.

Referring now to FIG. 11, there is shown in block diagram a construction in principle of an equal level addition circuit to which the present invention is applied. The equal level addition circuit includes an addition circuit 300 which adds a signal S1 and another signal S2 inputted as balance signals thereto and outputs S1+S2 as an addition output thereof.

The levels of the signals S1 and S2 inputted to the addition circuit 300 are varied in the opposite directions to each other in accordance with control signals Ec1 and Ec2 supplied to the addition circuit 300, respectively.

The equal level addition circuit further includes a pair of detection circuits 310A and 310B which detect outputs of the addition circuit 300. The thus detected outputs are inputted to an error amplifier 320, by which a level difference between the outputs of the signals S1 and S2 is detected.

An output of the error amplifier 320 is supplied to a gain control circuit 330, and the addition levels of the addition circuit 300 are controlled with the control signals Ec1 and Ec2 outputted from the gain control circuit 330 so that outputs of the inputted signals S1 and S2 are added to each other with levels equal to each other by a combination circuit 350.

The equal amplitude addition circuit further includes a constant voltage source 340 for generating a reference voltage.

With the equal amplitude addition circuit of FIG. 11, even when the signals S1 and S2 inputted thereto have a level difference, an addition output of S1+S2 after the levels of the signals S1 and S2 are adjusted to S1=S2 by the addition circuit 300 can be obtained from the combination circuit 350.

Figure 12:
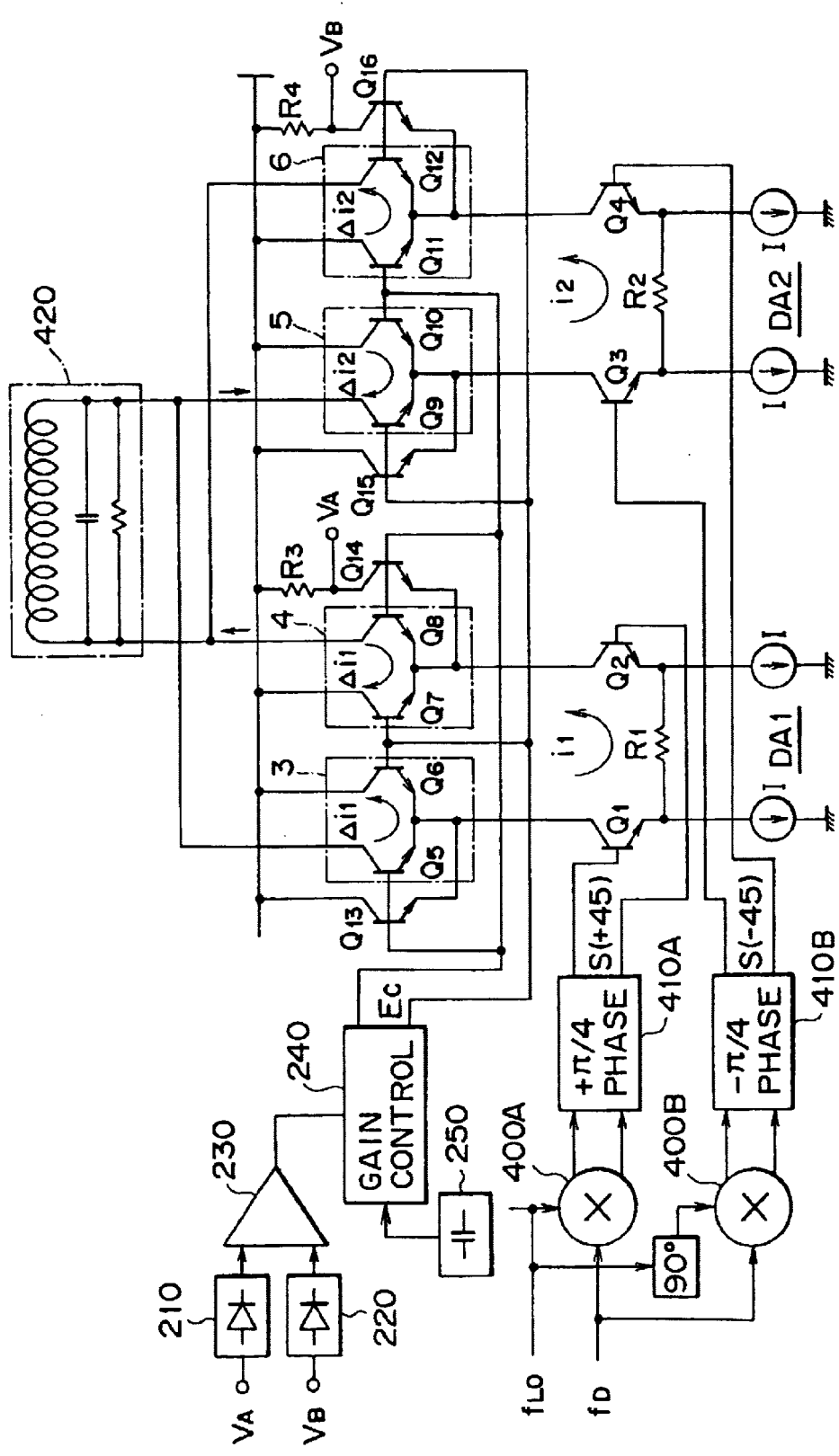
FIG. 12 is a circuit diagram showing a more detailed construction of the equal amplitude addition circuit of FIG. 11.

Referring now to FIG. 12, there is shown in circuit diagram an example of a detailed circuit construction of the addition circuit 300 shown in FIG. 11. The addition circuit 300 shown includes sixteen integrated transistors Q1 to Q16.

Signals S(+45) and S(−45) to be added to each other are, in the addition circuit 300 of FIG. 12, ac signals having a phase difference of π/2 from each other and form an intermediate frequency.

In particular, intermediate frequencies formed by two frequency mixers 400A and 400B to which a local frequency fLo and a desired received frequency fD are inputted are supplied through a phase shifting circuit 210A for π/4 (45 degrees) and another phase shifting circuit 210B for −π/4 (−45 degrees), respectively.

The signal S(+45) is inputted to a transistor Q1 and another transistor Q2 which form a first differential amplifier DA1 while the other signal S(−45) is inputted to a further transistor Q3 and a still further transistor Q4 which form a second differential amplifier DA2.

The first differential amplifier DA1 is connected so that output current i1 thereof serves as a common emitter current source for transistors Q5 and Q6 and transistors Q7 and Q8 which form two third and fourth differential pairs, respectively.

Also the second differential amplifier DA2 is connected similarly so that output current i2 thereof serves as a common emitter current source for transistors Q9 and Q10 and transistors Q11 and Q12 which form two fifth and sixth differential pairs, respectively.

An output of the transistor Q5 which forms the third differential pair and an output of the transistor Q8 which forms the fourth differential pair are connected to an impedance circuit (resonance circuit) which forms a composition circuit 420. Meanwhile, an output of the transistor Q9 which forms the fifth differential pair to which output current of the second differential amplifier DA2 is supplied and an output of the transistor Q12 which forms the sixth differential pair are supplied to the composition circuit 420 (impedance circuit). The thus inputted signals S(+45) and S(−45) are added by the composition circuit 420.

A control signal Ec is supplied from a gain control circuit 4 to the base electrodes of the transistors which form the four first, second, third and fourth differential pairs and is used to control the levels of the inputted signals S(+45) and S(−45) so that they may become equal to each other before the signals are added to each other.

More particularly, where ac current to flow through the first differential amplifier in response to an ac signal S(+45) inputted to the first differential amplifier DA1 is represented by i1, this current i1 is supplied as emitter current to the third and fourth differential pairs which form a multiplier.

If control voltage values supplied to the base electrodes of the transistors Q5 and Q6 of the third differential pair are different from each other, then ac current Δi1 which flows in the third differential pair is produced, and consequently, the transistors Q5 and Q6 are controlled so that the current to the transistor Q5 changes to i1+Δi1 while the current to the transistor Q6 changes to i1−Δi1.

Further, since control voltages of the opposite directions to each other are supplied similarly to the fourth differential pair to which emitter current is supplied from the first differential amplifier DA1, ac current Δi1 flows in the fourth differential pair and, for example, the current to the transistor Q8 changes to −i1−Δi1 while the current to the transistor Q7 changes to −i1+Δi1.

Also in the fifth and sixth differential pairs to which current is supplied from the second differential amplifier DA2, by the control voltage Ec applied to the base electrodes of the transistors of the fifth and sixth differential pairs, the current values to flow to the transistor Q9 and the transistor Q12 are controlled to i2−Δi2, −i2+Δi2 while the current values to the transistor Q10 and the transistor Q11 are controlled to i2+Δi2, −i2−i2, respectively.

In this manner, the current i1 supplied to the third and fourth differential pairs can be adjusted and the current i2 supplied to the fifth and sixth differential pairs can be adjusted in the opposite directions to each other.

Accordingly, if the control voltage Ec is set so that the current values of the current i1+Δi1 which is based on the addition signal S(+45) and the control voltage Ec and the current i2−Δi2 which is based on the addition signal S(−45) and the control voltage Ec may be equal to each other, then also when the levels of the signals S(+45) and S(−45) inputted to the composition circuit 420 are different from each other, the signals S(+45) and S(−45) can be added with the levels which are equal to each other.

In order to control the current i1 and the current i2, which are combined in such a manner as described above, to levels equal to each other, a transistor Q13 through which the current i1+Δi1 flows and another transistor Q16 through which the current i2−Δi2 flows are provided, and the current values of the addition currents i1+Δi1 and i2−Δi2 are detected by resistors R3 and R4 connected to the collectors of the transistors Q13 and Q16, respectively.

In particular, terminal voltages VA and VB of the resistors R3 and R4 are supplied to detection circuits 210 and 220, by which they are converted into dc voltage values, respectively.

Then, the control voltage Ec to be outputted from an gain control circuit 240 is controlled with an output of an error amplifier 230 which detects a voltage difference between the thus detected dc voltage values VA and VB so that the signals S(+45) and S(−45) are automatically added with levels equal to each other by the addition circuit.

It is to be noted that, in FIG. 12, reference numeral 250 denotes a reference voltage source for forming a control voltage, and I denotes a current source.

Further, the transistors Q13 and Q15 are provided to balance the pattern of the circuit.

Figure 13:
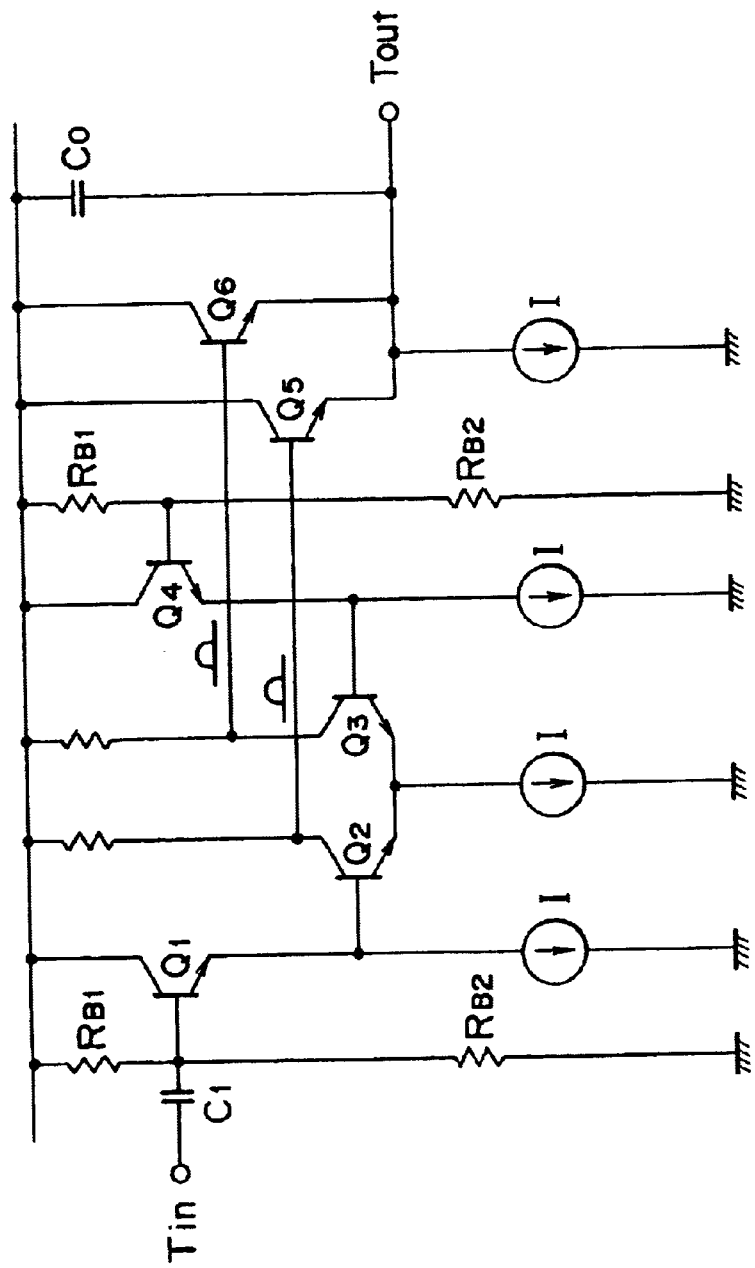
FIG. 13 is a circuit diagram showing an example of a detailed construction of a detection circuit which is employed in the equal amplitude addition circuit of FIG. 11 and detects an output level.

FIG. 13 shows in circuit diagram an example of a detailed construction of the detection circuits for detecting the level of an output signal.

Referring to FIG. 13, the terminal voltage VA or VB of the resistor R3 or R4 described above is inputted from an input terminal Tin and drives transistors Q2 and Q3, which form a differential pair, through a transistor Q1 which is formed as an emitter follower.

A transistor Q4 is biased from resistors RB1 and RB2 same as those for the transistor Q1. Consequently, when a detection voltage inputted from the base voltage of the transistor Q3 connected to the transistor Q4 is comparatively high, a positive signal is outputted from the transistor Q2, but when the detection voltage is comparatively low, a positive voltage is outputted from the collector of the transistor Q3.

The output voltage is outputted as a full wave detection signal from an output terminal Tout through a transistor Q5 or Q6. A capacitor C0 serves as a smoothing capacitor which removes high frequency components, and a capacitor C1 serves as a coupling capacitor.

Figure 14:
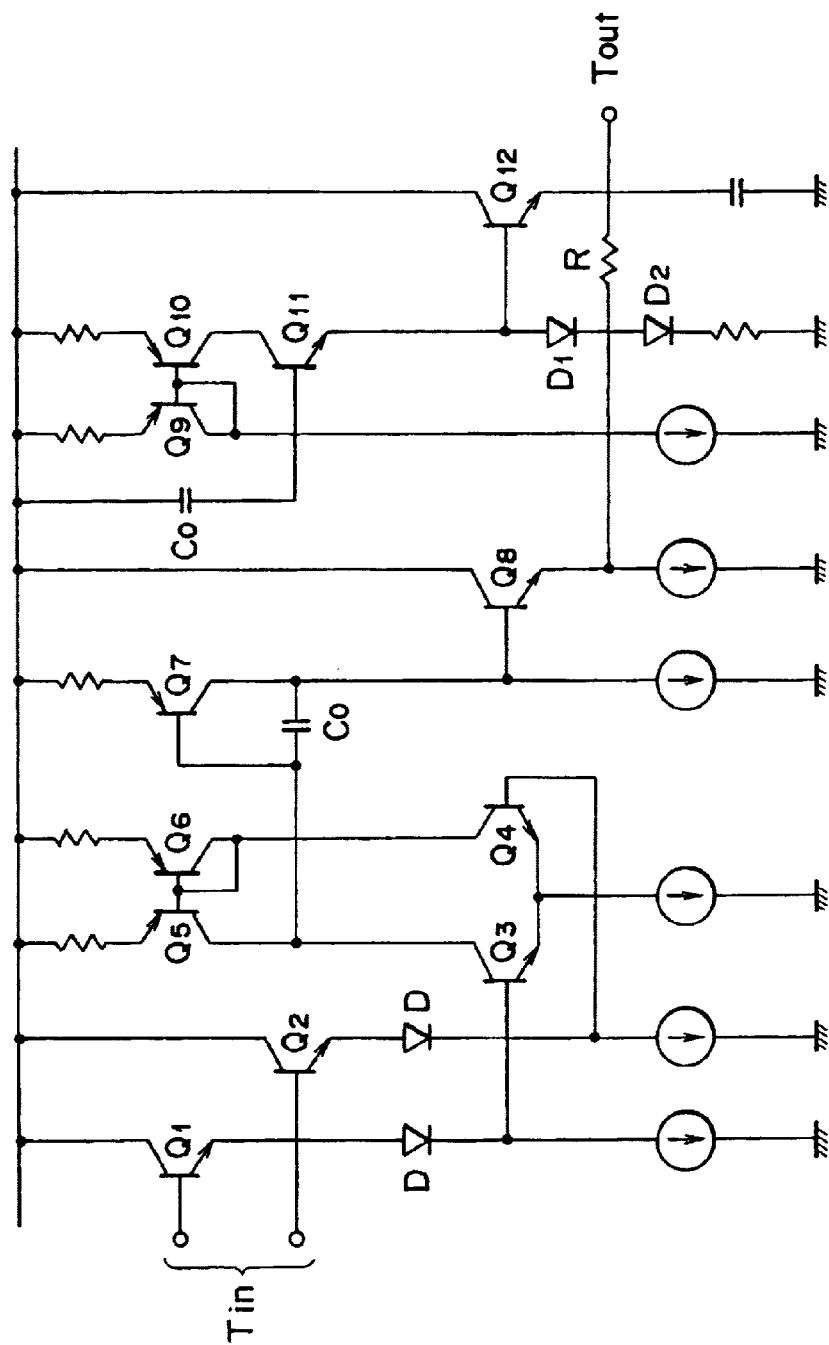
FIG. 14 is a circuit diagram showing a detailed construction of an error signal amplification circuit employed in the equal amplitude addition circuit of FIG. 11.

FIG. 14 shows in circuit diagram an example of a detailed construction of the error amplifier to which an output of the detection circuit is inputted.

Referring to FIG. 14, also in the error amplifier shown, an error signal component is inputted to two transistors Q1 and Q2 which are formed as emitter followers, and outputs of the transistors Q1 and Q2 are amplified by transistors Q3 and Q4 which form a differential pair, respectively.

Transistors Q5 and Q6 form a current mirror circuit, and a differential signal which flows through the differential pair is outputted to an output terminal Tout through transistors Q7 and Q8 so that the output is inputted to the gain control circuit in the next stage.

A capacitor C0 is provided to suppress high frequency components. Transistors Q9, Q10, Q11 and Q12 and diodes D1 and D2 form a level shifting circuit which applies a bias voltage of, for example, approximately 0.8 V to the output terminal Tout so that the input to the gain control circuit in the next stage may not have an offset.

Figure 15:
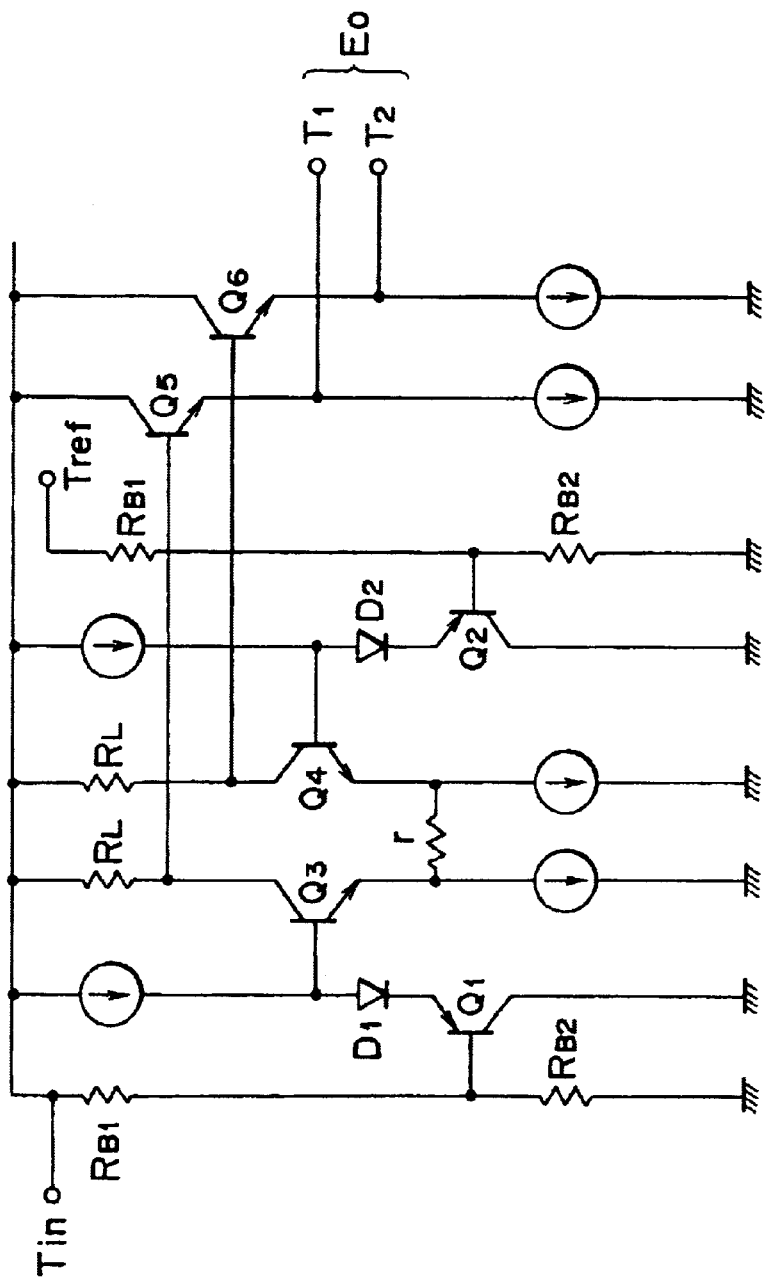
FIG. 15 is a circuit diagram showing an example of a detailed construction of a gain control circuit employed in the equal amplitude addition circuit of FIG. 11.

FIG. 15 shows in circuit diagram an example of a detailed construction of the gain control circuit. Referring to FIG. 15, the output of the error amplifier described hereinabove is supplied from a terminal Tin to a transistor Q1 through a resistor RB1.

Meanwhile, a reference signal used as a reference voltage is supplied from a terminal Tref to a transistor Q2. The emitter outputs of the transistors Q1 and Q2 are supplied through diodes D1 and D2 to the base electrodes of transistors Q3 and Q4, respectively, which form a differential amplifier.

Output signals amplified by the differential amplifier are led out to output terminals T1 and T2 through transistors Q5 and Q6, respectively. Consequently, a potential difference between the output terminals T1 and T2 is supplied as a control signal Ec to the differential pair of the equal amplitude addition circuit described hereinabove.

Figure 16A:
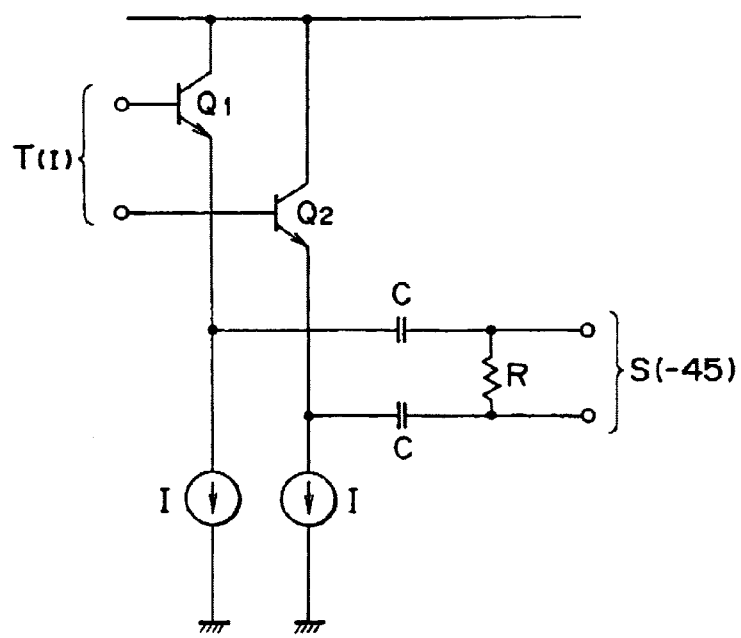
FIGS. 16A and 16B are circuit diagrams showing examples of detailed constructions of $+\pi/4$ and $-\pi/4$ phase shifting circuits employed in the equal amplitude addition circuit shown in FIG. 12.
Figure 16B:
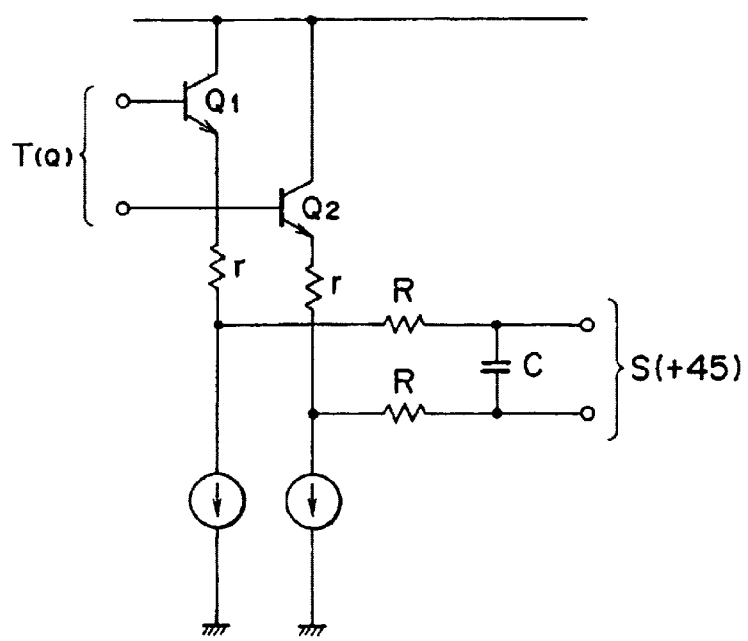
Figure 17:
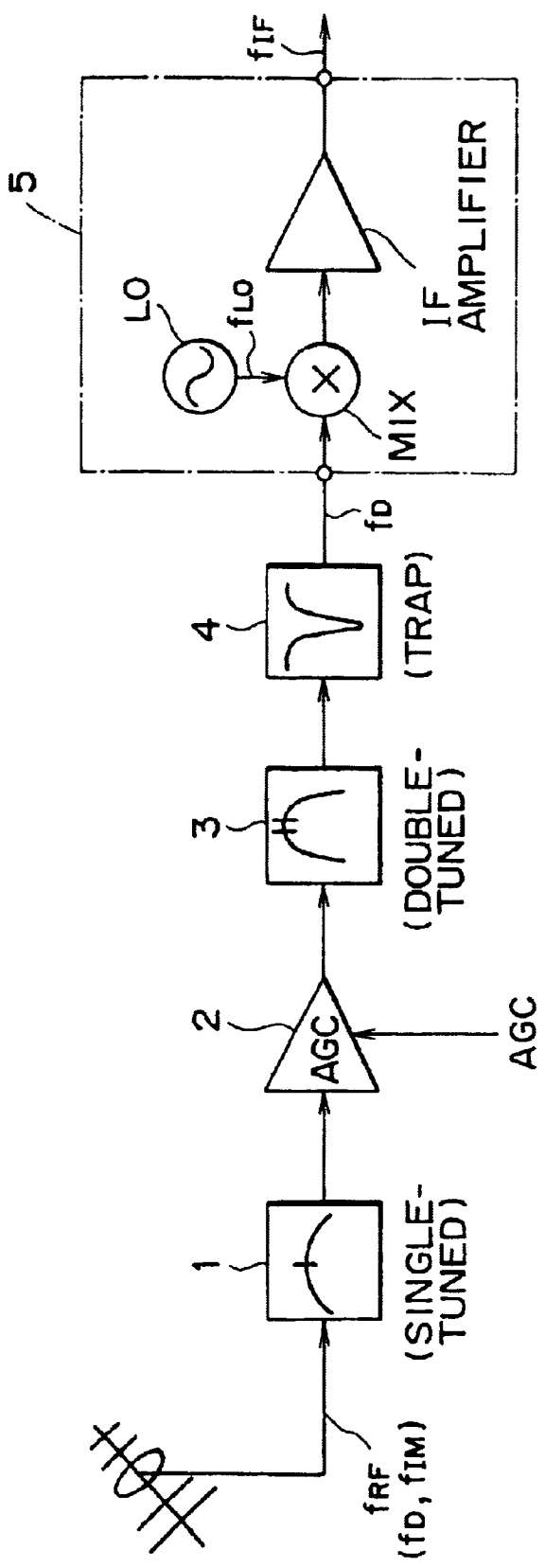
FIG. 17 is a block diagram of an ordinary television reception circuit.
Figure 18:
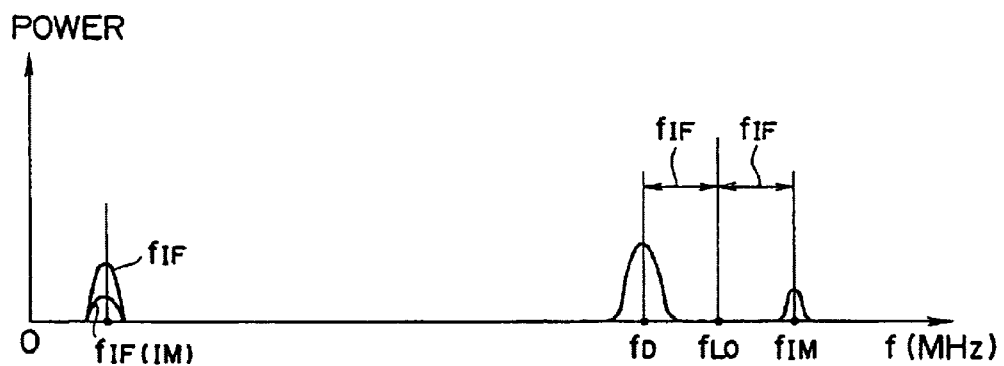
FIG. 18 is a diagram illustrating an image frequency.
Figure 19:
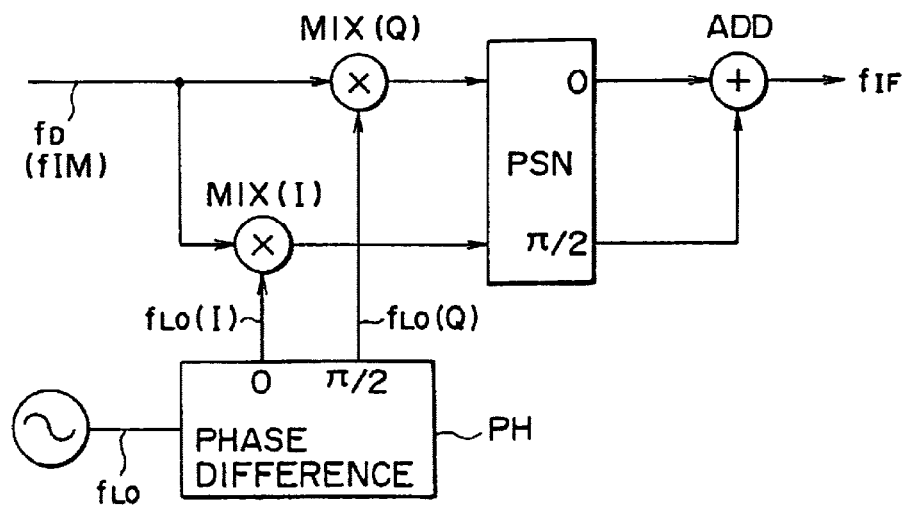
FIG. 19 is a block diagram of a mixing circuit which has an image cancellation function.

Examples of detailed constructions of the +π/4 phase shifting circuit and −π/4 phase shifting circuit of FIG. 12 are shown in FIGS. 16A and 16B, respectively.

Referring to FIGS. 16A and 16B, the +π/4 phase shifting circuit and the −π/4 phase shifting circuit shown receive two intermediate frequencies, which are supplied where the equal amplitude addition circuit in which they are included is applied to a television reception circuit as described hereinabove with reference to FIG. 1, as balance signals from terminals T(I) and T(Q).

Referring first to FIG. 16A, the signal inputted from the terminal T(I) is converted into a signal source of a high impedance by the transistors Q1 and Q2 formed as an emitter follower and is then shifted by π/4 in phase by a phase shifting circuit formed from a capacitor C and a resistor R, whereafter it is outputted from the +π/4 phase shifting circuit of FIG. 16A.

In other words, since the +π/4 phase shifting circuit of FIG. 16A is formed so as to include a high-pass filter, if the resistor R and the capacitor C are set so that they are equal in impedance to each other, then the circuit of FIG. 16A causes an input signal to have a lead phase by π/4.

On the other hand, while the circuit of FIG. 16B has a similar circuit construction, since it is formed so as to include a low-pass filter, it acts as a phase lag circuit which outputs an output signal which lags by π/4 with respect to an input signal.

While preferred embodiments of the present invention have been described using specific terms, such description is for illustrative purpose only, and it is to be understood that changes and variations may be made without departing from the spirit or scope of the following claims.

What is claimed is:

1. A television signal reception circuit, comprising an integrated circuit including:

an automatic gain circuit for controlling a level of an input signal;

first and second frequency mixture circuits to which an output of said automatic gain circuit is inputted;

a π/2 phase shifting circuit for supplying local oscillation frequencies having a phase difference of π/2 from each other to said first and second frequency mixture circuits;

a first π/4 phase shifting circuit for shifting a phase of an output of said first frequency mixture circuit by +π/4;

a second π/4 phase shifting circuit for shifting a phase of an output of said second frequency mixture circuit by −π/4; and an addition circuit for adding outputs of said first and second π/4 phase shifting circuits;

said television signal reception circuit outputting a television signal inputted to said integrated circuit through a variable frequency tuning circuit as an intermediate frequency signal, wherein said addition circuit is an equal amplitude addition circuit, comprising:

a first differential amplification circuit for amplifying a first addition signal inputted thereto;

a second differential amplification circuit for amplifying a second addition signal inputted thereto;

first conversion means for converting an output of said first differential amplification circuit into a signal of a predetermined level in accordance with a control signal;

second conversion means for converting an output if said second differential amplification circuit into a signal of a predetermined level in accordance with the control signal;

detection means for detecting output levels of said first and second means;

gain control means for generating the control signal in response to a detection signal of said detection means; and addition means for adding signals outputted form said first and second conversion means;

the levels of the output signals of said first and second conversion means being controlled so as to be equal to each other in accordance with the control means signal outputted from said gain control means.

2. An equal amplitude addition circuit according to claim 1, wherein said first conversion means includes third and fourth differential pairs connected such that the output of said first differential amplification circuit may serve as common emitter current of said third and fourth differential pairs, and said second conversion means includes fifth and sixth differential pairs connected such that the output of said second differential amplification circuit may serve as common emitter current of said fifth and sixth differential pairs.

3. An equal amplitude addition circuit according to claim 1, wherein the control signal is used to control gains of said first and second conversion means in the opposite directions to each other.

4. An equal amplitude addition circuit according to claim 2, wherein said detection means detects the output levels of said first and second conversion means by detecting an output of said fourth differential pair and an output of said sixth differential pair.

5. An equal amplitude addition circuit according to claim 1, wherein the first addition signal and the second addition signal have a phase difference of 90 degrees from each other.

6. An equal amplitude addition circuit according to claim 1, wherein said equal amplitude addition circuit is formed from an integrated circuit wherein analog circuits of the balance type are integrated.

7. An equal amplitude addition circuit, comprising:

a first differential amplification circuit for amplifying a first addition signal inputted thereto;

a second differential amplification circuit for amplifying a second addition signal inputted thereto;

first conversion means for converting an output of said first differential amplification circuit into a signal of a predetermined level in accordance with a control signal;

second conversion means for converting an output if said second differential amplification circuit into a signal of a predetermined level in accordance with the control signal;

detection means for detecting output levels of said first and second means;

gain control means for generating the control signal in response to a detection signal of said detection means; and addition means for adding signals outputted form said first and second conversion means;

the levels of the output signals of said first and second conversion means being controlled so as to be equal to each other in accordance with the control means signal outputted from said gain control means.

8. An equal amplitude addition circuit according to claim 7, wherein said first conversion means includes third and fourth differential pairs connected such that the output of said first differential amplification circuit may serve as common emitter current of said third and fourth differential pairs, and said second conversion means includes fifth and sixth differential pairs connected such that the output of said second differential amplification circuit may serve as common emitter current of said fifth and sixth differential pairs.

9. An equal amplitude addition circuit according to claim 7, wherein the control signal is used to control gains of said first and second conversion means in the opposite directions to each other.

10. An equal amplitude addition circuit according to claim 8, wherein said detection means detects the output levels of said first and second conversion means by detecting an output of said fourth differential pair and an output of said sixth differential pair.

11. An equal amplitude addition circuit according to claim 7, wherein the first addition signal and the second addition signal have a phase difference of 90 degrees from each other.

12. An equal amplitude addition circuit according to claim 7, wherein said equal amplitude addition circuit is formed from an integrated circuit wherein analog circuits of the balance type are integrated.

* * * * *